United States Patent
Nagaoka et al.

(10) Patent No.: US 9,048,667 B2
(45) Date of Patent: Jun. 2, 2015

(54) CELL CONTROLLER, BATTERY MODULE AND POWER SUPPLY SYSTEM

(75) Inventors: Masaki Nagaoka, Saitama (JP); Akihiko Kudo, Ibaraki (JP); Mutsumi Kikuchi, Ibaraki (JP); Kenichiro Tsuru, Ibaraki (JP); Tatsumi Yamauchi, Ibaraki (JP); Akihiko Emori, Ibaraki (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 700 days.

(21) Appl. No.: 13/347,409

(22) Filed: Jan. 10, 2012

(65) Prior Publication Data

US 2012/0141848 A1 Jun. 7, 2012

Related U.S. Application Data

(63) Continuation of application No. 11/971,564, filed on Jan. 9, 2008, now Pat. No. 8,264,204.

(30) Foreign Application Priority Data

May 16, 2007 (JP) ................................. 2007-129972

(51) Int. Cl.
*H02J 7/00* (2006.01)
*B60L 11/18* (2006.01)

(52) U.S. Cl.
CPC ........... *H02J 7/0016* (2013.01); *B60L 11/1855* (2013.01); *B60L 11/1866* (2013.01);
(Continued)

(58) Field of Classification Search
CPC . H02J 7/0016; B60L 11/1855; B60L 11/1866
USPC .................. 320/116, 118, 134, 136, 163, 166
See application file for complete search history.

(56) References Cited

U.S. PATENT DOCUMENTS 5,982,142 A  11/1999  Sullivan et al.
6,538,866 B1  3/2003  Hanzawa et al.
(Continued)

FOREIGN PATENT DOCUMENTS

EP  0240883  10/1987
EP  1251636  10/2002
(Continued)

OTHER PUBLICATIONS

Official Action including English translation for Japanese Patent Application No. JP 2011-142668, mailed Jul. 23, 2013, 6 pages.
(Continued)

*Primary Examiner* — Edward Tso
*Assistant Examiner* — Aaron Piggush
(74) *Attorney, Agent, or Firm* — Jason H. Vick; Sheridan Ross, PC

(57) ABSTRACT

A suppressed noise cell controller includes, corresponding to a number of cell packs, a plurality of ICs each having a voltage detecting circuit detecting voltages of respective cells of a cell pack in which four cells are connected in series, a switch control circuit controlling conduction and a blocking operation of a plurality of switch elements connected in parallel to the respective cells via capacity adjusting resistors, terminal LIN1 for inputting control information, terminal LIN2 for outputting control information, terminal Vcc and GND terminal, and terminal LIN2 of a higher-order IC and terminal LIN1 of a lower-order IC are daisy chain connected. The Vcc terminal of each IC is connected to a positive electrode of a higher-order cell among cells constituting a corresponding cell pack via a noise eliminating inductor, and the GND terminal is coupled directly to Vcc of the lower-order IC. Noise isn't superposed on LIN1 or LIN2.

23 Claims, 17 Drawing Sheets

(52) U.S. Cl.
CPC .......... *B60L11/1879* (2013.01); *Y02T 10/7005* (2013.01); *Y02T 10/7011* (2013.01); *Y02T 10/7061* (2013.01)

(56) References Cited

U.S. PATENT DOCUMENTS

| | | | |
|---|---|---|---|
| 6,891,352 | B2 | 5/2005 | Miyazaki et al. |
| 7,091,695 | B2 | 8/2006 | Miyazaki et al. |
| 7,511,457 | B2 | 3/2009 | Emori et al. |
| 2005/0242775 | A1* | 11/2005 | Miyazaki et al. .............. 320/116 |
| 2005/0242776 | A1 | 11/2005 | Emori et al. |
| 2007/0247117 | A1 | 10/2007 | Morita et al. |
| 2008/0284375 | A1 | 11/2008 | Nagaoka et al. |

FOREIGN PATENT DOCUMENTS

| | | |
|---|---|---|
| EP | 1289096 | 3/2003 |
| GB | 1590375 | 6/1981 |
| JP | 07-20001 | 4/1995 |
| JP | 09-247851 | 9/1997 |
| JP | 10-270006 | 10/1998 |
| JP | 11-168173 | 6/1999 |
| JP | 2000-332207 | 11/2000 |
| JP | 2002-278660 | 9/2002 |
| JP | 2003-70179 | 3/2003 |
| JP | 2004-335805 | 11/2004 |
| JP | 2005-318750 | 11/2005 |
| JP | 2005-318751 | 11/2005 |
| JP | 2005-348457 | 12/2005 |
| JP | 2007-287416 | 11/2007 |

OTHER PUBLICATIONS

Notice of Allowance for U.S. Appl. No. 11/971,564, mailed Jun. 8, 2012.
European Search Report for European Patent Application No. 08150737.8, mailed Jul. 27, 2012.
Official Action including English translation for Chinese Patent Application No. 201110090915.2, mailed Mar. 4, 2013, 22 pages.
Official Action for U.S. Appl. No. 11/971,564, mailed Oct. 6, 2011 14 pages.
Official Action including English translation for Japan Patent Application No. JP 2007-129972, mailed Jul. 12, 2011, 8 pages.

* cited by examiner (A)

(B)

(C)

(D)

(A)

(B)

(C)

(D)

CELL CONTROLLER, BATTERY MODULE AND POWER SUPPLY SYSTEM

CROSS REFERENCE TO RELATED APPLICATIONS

This application is a continuation of U.S. patent application Ser. No. 11/971,564, filed Jan. 9, 2008, now U.S. Pat. No. 8,264,204, which claims the benefit under 35 U.S.C. 119 (a) to Japanese Application No. JP 2007-129972, filed May 16, 2007, the entire disclosure of each are incorporated herein by reference in their entirety.

FIELD OF THE INVENTION

The present invention relates to a cell controller, a battery module and a power supply system, and more particularly relates to a cell controller for controlling a serially connected body of cells in which a plurality of cells are connected in series, a battery module including the cell controller, and a power supply system including the battery module.

DESCRIPTION OF THE RELATED ART

Conventionally, for example, as a power supply for charging/discharging large current for a hybrid electric vehicle (HEV) which is driven by an engine and a motor or an electric vehicle such as a pure electric vehicle (PEV) which is driven only by a motor, it has been used a battery module including a serially connected body of cells including a plurality of cells such as nickel hydride secondary cells, lithium secondary cells, or the like connected in series.

A cell controller mounted in a vehicle, a battery module including the cell controller, and a power supply system including the battery module has a possibility to be used in various environments for a long period, and it is an important problem to be capable of maintaining high reliability even when being used in a harsh environment.

Note that as background arts related to the present invention, there are disclosed a technique to construct a battery module by connecting a large number of cells (for example, refer to Japanese Patent Application Laid-open No. H10-270006), and a technique to have a plurality of ICs corresponding to the number of battery units and perform transmission of information in a daisy chain between the ICs (for example, refer to Japanese Patent Application Laid-open No. 2003-70179, Japanese Patent Application Laid-open No. 2005-318750, Japanese Patent Application Laid-open No. 2005-318751).

SUMMARY OF THE INVENTION

A problem to be solved by the present invention is to provide a cell controller, a battery module or a power supply system which have excellent reliability, or to improve reliability of an on-vehicle system. Note that in an embodiment described below, various problems can be solved besides the above-described problem. These problems and means for solving them will be described in detail in the embodiment.

A cell controller to which the present invention is applied includes, corresponding to groups, a plurality of ICs each having a voltage detecting unit detecting voltages of respective cells constituting the groups, a switch control unit controlling conduction and a blocking operation of a plurality of switch elements connected in parallel to the respective cells via resistors, an information input terminal for inputting control information, an information output terminal for outputting control information, a power supply terminal (hereinafter referred to as Vcc terminal) and a reference potential terminal (hereinafter referred to as GND terminal), and an information output terminal of a higher-order IC and an information input terminal of a lower-order IC are connected in a daisy chain. The Vcc terminal of each IC is connected to a positive electrode of a higher-order cell among cells constituting a corresponding group via a first inductor for eliminating noise. Such a cell controller is also used for a battery module and a power supply system.

According to the present invention, a highly reliable cell controller, battery module including the cell controller, and power supply system including the battery module or a highly reliable on-vehicle system using them can be obtained.

DETAILED DESCRIPTION OF THE PREFERRED EMBODIMENTS

Figure 1:
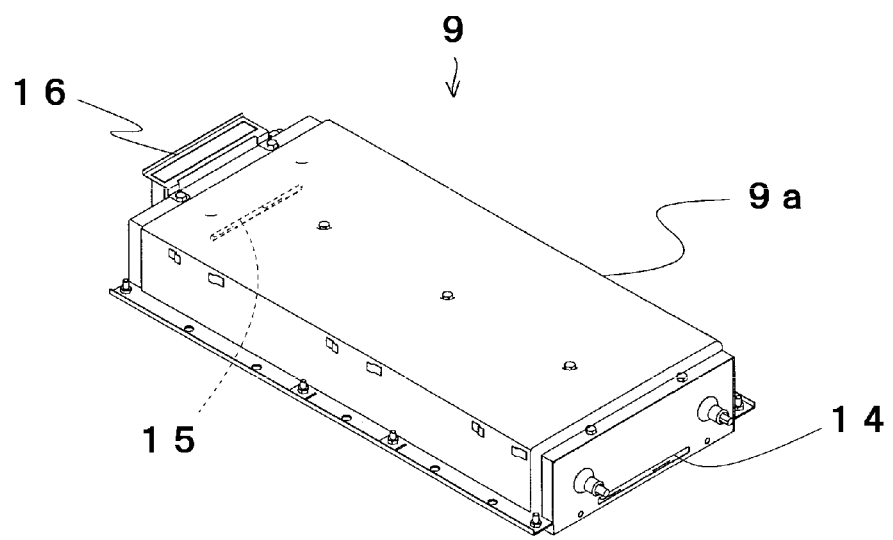
FIG. 1 is an exterior perspective view of a battery module included in a power supply system of an embodiment to which the present invention is applicable.

A cell controller for mounting on a vehicle or a battery module including the cell controller or a power supply system including the battery module, which will be explained in an embodiment below, has an effect of improving reliability, but achieves not only this effect but also other effects. More specific effect regarding the improvement of reliability or effects other than the improvement of reliability which the embodiment below has will be explained next.

[Improvement of Reliability]

The cell controller for lithium secondary cells or the battery module including the cell controller or the power supply system including the battery module, which will be explained below, can obtain large effects in terms of improvement of reliability. A rotary electrical machine mounted in a vehicle requires large electrical power. Also, an on-vehicle power supply is required to be made smaller or lighter. Lithium secondary batteries which are small and capable of providing large electrical power are expected largely as on-vehicle power supply.

It is conceivable that a lithium secondary battery mounted in a vehicle is used as power supply for a rotary electrical machine for driving a vehicle or for a rotary electrical machine for power steering. As a typical on-vehicle rotary electrical machine, there are synchronous electric motors using a permanent magnet or induction motors having a cage-type rotor. For driving any one of these rotary electrical machines, an inverter device is necessary, which performs power conversion between direct current power and alternate current power. The inverter device performs the aforementioned conversion between direct current power and alternate current power by a switching operation of a power switching element such as an IGBT or a MOS transistor constituting a bridge circuit. By this switching operation, large noise is generated and affects the direct current power supply system. The cell controller for lithium secondary cells or the battery module including the cell controller or the power supply system including the battery module, which will be explained later as an embodiment, exhibits a large effect in terms of improvement of reliability in the on-vehicle system using the aforementioned inverter device for power conversion.

Further, the inverter device normally has a smoothing capacitor for eliminating noise generated by the inverter device. For eliminating the aforementioned noise, it is desirable to increase the capacity of the smoothing capacitor. However, thorough elimination of noise leads to increase in size of the aforementioned smoothing capacitor, and also leads to increase in size and cost of the device. Therefore, it is desirable that the direct current power supply system itself becomes tough against noise. Further, the capacitor, particularly an electrolytic capacitor has a problem in temperature characteristics of the capacitor such that the capacity decreases at a low temperature. The on-vehicle power supply is used in an environment where the temperature changes frequently. It is desirable that the on-vehicle power supply exhibits a sufficient ability even in an environment where the temperature changes from minus 30° C. or minus 40° C. to nearly 100° C. for example. The capacitor has a possibility of decrease in ability as a capacitor when the temperature lowers. The electrolytic capacitor in particular has large characteristics deterioration. Accordingly, in a low temperature state, with a temperature of minus 10° C. or lower for example, the ability as a smoothing capacitor decreases rapidly. The cell controller for lithium secondary cells or the battery module including the cell controller or the power supply system including the battery module, which will be explained later as an embodiment, can maintain high reliability also against deterioration of a noise elimination characteristic due to characteristics deterioration of the capacitor.

Nickel hydride batteries have large decrease in ability at a low temperature, for which control that can suppress supplied power at a low temperature is considered. Accordingly, the influence of noise to characteristics deterioration of the capacitor at a low temperature is not taken as a problem so much. However, lithium secondary batteries are excellent in characteristics at a low temperature than the nickel hydride batteries, and it is conceivable to use a lithium secondary battery at a low temperature. Accordingly, a cell controller or the like that can endure increase in influence of noise due to deterioration of low temperature characteristics of the capacitor is desired. The embodiment described below has an effect to suppress such increase in influence of noise.

When a lithium secondary battery is used as an on-vehicle direct current power supply, a large number of lithium secondary cells as cells are connected in series, and it is necessary to control charge/discharge states of the cells (unit cells) connected in series respectively with high accuracy. Accordingly, it is necessary to reduce imbalance in charge/discharge states of the cells by detecting a terminal voltage of each cell. In the embodiment which will be described later, for reasons such as simplification of the system and reduction in price, a detection circuit for the terminal voltages of the cells, a control circuit for reducing the imbalance in charge/discharge states, and a switching circuit performing conduction or blocking of a discharge current are made by an IC. A plurality of such ICs are used in combination to enable control to reduce imbalance in charge/discharge states of cells constituting the lithium secondary battery. According to this embodiment, other than the above-described operation and effect, there is further an effect to improve reliability in control of the charge/discharge states of the cells connected in series. Further, there is an effect to realize this control by a relatively simple circuit structure. As a result, realization of reduction in price becomes easy.

In the embodiment below, the ICs operate by power supplied from the cells, which are targets of detecting a terminal voltage, and the ICs have different reference voltages. Control information transmitted/received to/from the ICs is transmitted via a loop transmission path constituted of the ICs connected in order of the levels of reference voltages, and by this loop transmission, transmission/reception to/from the ICs are performed. In the cell controller or the battery module including the cell controller or the power supply system including the battery module in which the loop transmission path is thus formed by the ICs, noise generated by the inverter device, which is applied to a direct current power output terminal of the lithium secondary battery module enters the ICs not only from the detection circuit for terminal voltages of the cells but through the loop transmission path, there is a concern of giving an influence that leads to malfunction or circuit destruction. A circuit described as an embodiment which will be explained below can reduce influence of noise via the aforementioned loop transmission path, and has an effect to be capable of maintaining high reliability other than the above-described effects.

In a nickel hydride secondary battery and a lithium secondary battery, it is desirable to detect terminal voltages and perform management of charge/discharge states of cells or the like. In the nickel hydride secondary battery, terminal voltages are detected by dividing into blocks. In the lithium secondary battery, all terminal voltages of cells are detected and charge/discharge states are managed so that all the cells will not be overcharged. For simplifying connecting operation, in the embodiment described below, a large number of lines for detecting terminal voltages of cell blocks or cells constituting a battery are led to the cell controller and connected to the circuit of the cell controller with connectors. The aforementioned connectors are connected to the circuit of the cell controller in a state that terminal voltages of the battery block or the cells constituting the battery are applied thereto, and during the connecting operation, there exists a state that part of terminals of the connectors are connected partially. Once the connectors are connected completely, a planned voltage is applied to the circuit of the cell controller, but when only part of the connectors are connected, it is possible that an abnormal voltage is applied thereto.

Particularly in a lithium secondary battery, a wiring for detecting a terminal voltage is necessary between terminals of each cell and the cell controller, which results in that the connectors have a large number of connecting pins. Accordingly, when the connectors are connected or released, it is highly possible that a partial connection occurs in which only a part of the connectors is connected. The embodiment explained below has an effect to be capable of protecting a circuit such as the cell controller against damage due to application of an abnormal voltage even when the partial connection in which only a part of the connectors are connected occurs, other than the above-described effects. Also, in the embodiment explained below, there are provided a plurality of connectors, in which connectors for connecting terminals of cells on a high potential side to the circuit of the cell controller and connectors for connecting terminals of cells on a low potential side to the circuit of the cell controller are separated. This enables lowering of abnormal voltage applied to the circuit of the cell controller when pins of the connectors are connected partially, and the influence of the above-described partial connection of the connectors can be reduced further. Moreover, the embodiment further has an effect to be capable of protecting the circuit of the cell controller by providing a diode or the like for protecting an IC at an appropriate position as will be explained below.

[Uniformization of Power Consumption of Cells]

Other than the above-described effects, in the embodiment below, the following improvements are made for uniformizing power consumption of the cells connected in series as much as possible, and there is an effect to reduce imbalance of charge/discharge states of the cells. When the charge/discharge states of the cells can be uniformized, a possibility that only a certain cell is overcharged becomes low in a charging operation of the cells connected in series, and thereby safety and reliability of the entire module battery improve.

The cells connected in series are divided in groups, ICs are provided corresponding to the groups, and each IC operates by power from cells constituting a corresponding group. By uniformizing the number of cells constituting each group as much as possible, there is an effect that the cells connected in series can bear the power consumed by the ICs as even as possible, and there is an effect that imbalance of charge/discharge states of the cells can be reduced.

Also, the ICs receive a power supply voltage from a battery terminal (electrode of the battery) having a highest voltage in a corresponding group and operates with a battery terminal (electrode of the battery) having a lowest voltage in the aforementioned group being a reference potential. With this structure, the power required for the ICs to operate is shared evenly among the cells in the corresponding group, thereby providing an effect that imbalance in charge/discharge states of the cells can be reduced.

Signal transmission as an important function of the ICs is performed via a loop constituted by all the ICs. Accordingly, the power consumed by transmission of a signal becomes uniform among the ICs. Even if transmission/reception between part of the ICs and the aforementioned control device increases, the transmission of a signal passes all the ICs, thereby providing an effect that the power consumption is uniformized. Further, the embodiment below has a structure in which power required for each IC to operate is obtained from all the cells constituting the group to which this IC corresponds to, thereby providing an effect that the imbalance in charge/discharge states of the cells constituting the secondary battery can be reduced.

In the embodiment below, a LIN12 terminal is provided in each IC for corresponding to a load having large power consumption. The load having large power consumption is, for example, a photo transistor operating at high speed. When the IC transmits/receives a signal to/from the load having large power consumption, a large current can be provided to the aforementioned load from the LIN12 terminal. On the other hand, an IC connected to a load having small power consumption can originally perform an operation of transmission/reception of a signal precisely even when the LIN12 terminal is released, but in the embodiment below, the aforementioned LIN12 terminal is connected to a terminal for transmitting/receiving a signal between adjacent ICs, for example a LIN2 terminal for transmission. Each IC is made to operate precisely even when a current of the aforementioned LIN12 terminal flows. The embodiment below has a structure to uniformize the power consumption of the ICs as much as possible by thus providing the LIN12 terminal for a load having large power consumption, and connecting the LIN12 terminal to the transmission/reception terminal of each IC even when a load having large power consumption is not present. Therefore, in the embodiment below, there is an effect that power consumption of the ICs is balanced as much as possible, which is an effect other than the above-described effects. By balancing the power consumption of the ICs, there is an effect that the power consumption of the cells connected in series is balanced.

Hereinafter, an embodiment of applying the present invention to an on-vehicle power supply system will be described with reference to the drawings. The following embodiment is explained as examples of applying the present invention to a power supply system for a hybrid vehicle, but as a matter of course, the embodiment can also be applied to a pure electric vehicle which runs only by torque of a rotary electrical machine instead of hybrid drive, in other words, instead of a structure to run a vehicle directly by torque of an engine.

(Structure)

Figure 2:
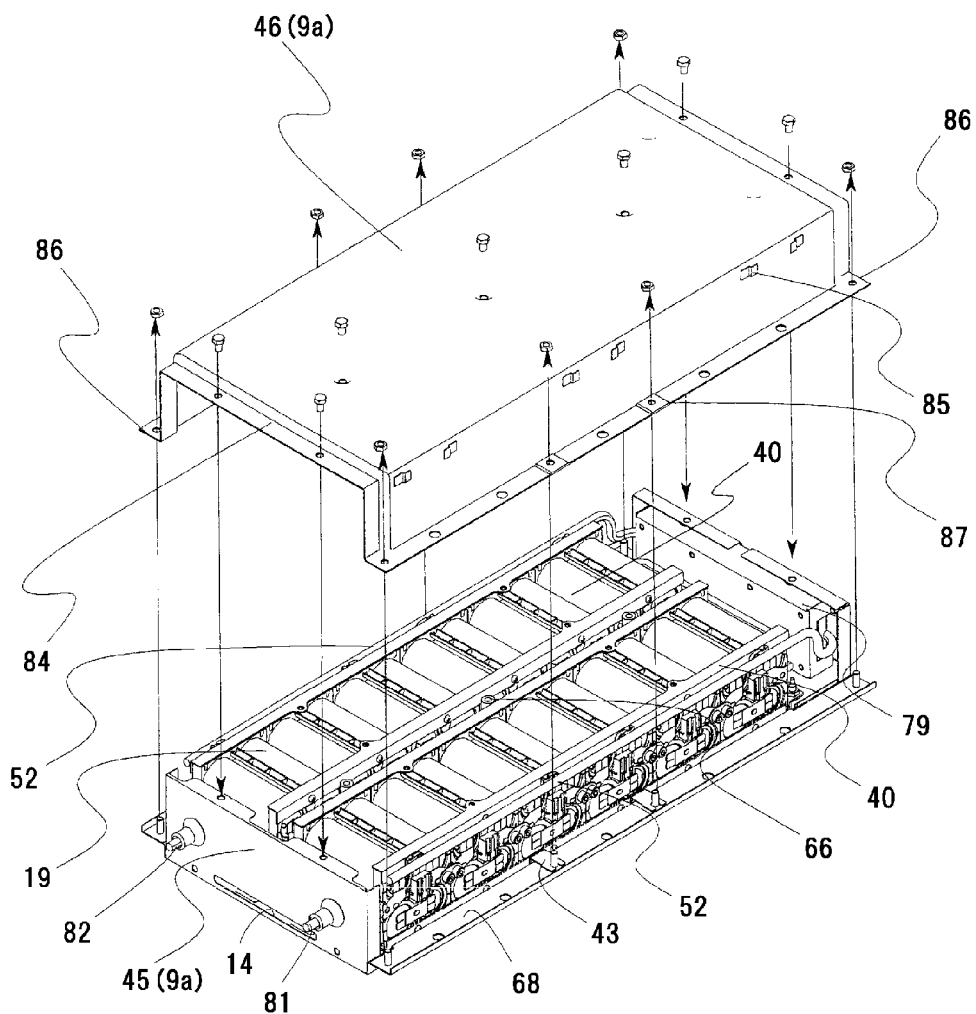
FIG. 2 is a perspective view showing an assembly state of an upper cover of a battery module.

The power supply system of this embodiment has two stacked battery modules which constitute a high voltage battery. As shown in FIG. 1 and FIG. 2, a battery module 9 has a module case 9*a* in a substantially rectangular parallelepiped shape, which is made of metal and constituted of an upper cover 46 and a lower cover 45. In the module case 9*a*, a plurality of cell packs 19 are accommodated and fixed. The battery module 9 is covered by the module case 9*a* which is a metal case, and in the module case 9*a*, a large number of wirings for detecting voltage, temperature and so on exist, but they are protected against electrical noise from the outside.

Further, as described above, the cells are protected by the module case 9a and a container on the outside thereof, and thereby safety of the power supply system will be maintained even if a traffic accident occurs.

<<The Cell Packs>>

Figure 7:
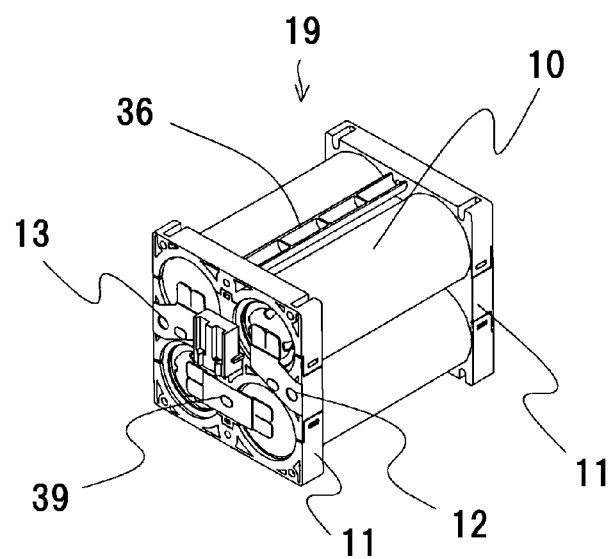
FIG. 7 is an exterior perspective view of the cell pack.
Figure 8:
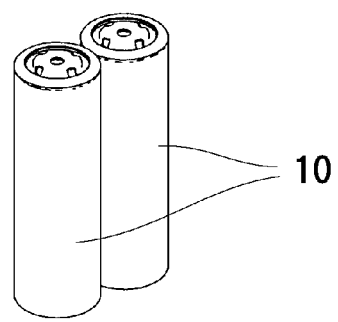
FIG. 8 is an exterior perspective view of cylindrical lithium secondary cells constituting the cell pack.

As shown in FIG. 7, in a cell pack 19, a plurality of (four in this embodiment) cells 10 are arranged in two lines and two rows to have alternating polarities, and the plurality of, preferably four, cells 10 are connected in series. Although there are various types of shapes of cells, cylindrical lithium secondary cells each covered by a casing having high heat conductivity are used as cells in this embodiment as shown in FIG. 8, with positive electrode active material being lithium manganese complex oxide and negative electrode active material being amorphous carbon. These cells of lithium secondary cells have a nominal voltage of 3.6 V and a capacity of 5.5 Ah, but terminal voltages of the cells change as charge states change. When charge amounts in the cells decrease, the terminal voltages decrease to about 2.5 volt, and when charge amounts in the cells increase, the terminal voltages increase to about 4.3 volt.

Figure 5:
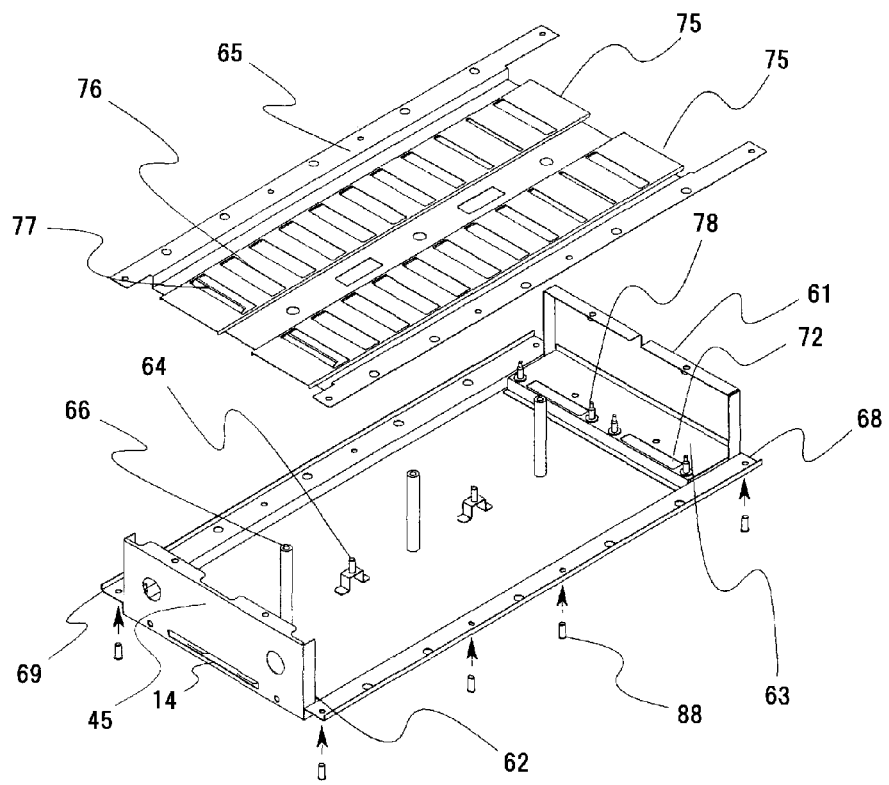
FIG. 5 is an exploded perspective view of lower cover components of the battery module.
Figure 6:
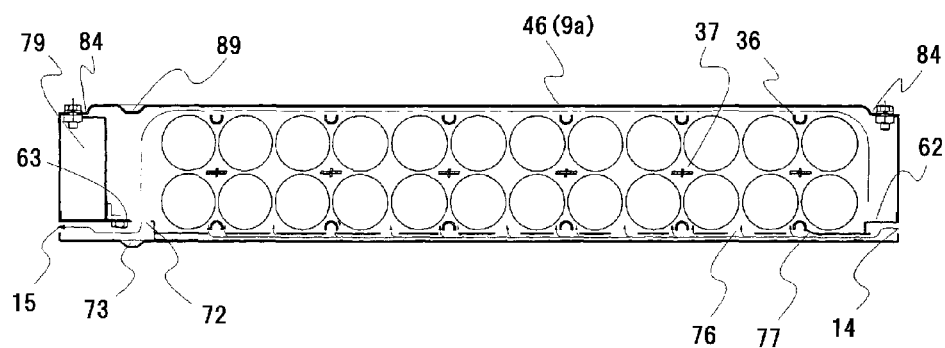
FIG. 6 is a schematic cross-sectional view of the battery module schematically showing distribution paths of cooling air.

In this embodiment, the cells 10 are integrated as the cell packs 19 with a positional relationship such that side faces thereof oppose each other, and these cell packs 19 are fixed inside the module case 9a with an arrangement relationship such that the side faces of the cells oppose each other as shown in FIG. 6. This arrangement relationship is excellent for improving productivity. Moreover, such a structure simplifies the connecting operation of a detection harness 52, a high voltage cable 35, and so on, which will be explained below using FIG. 3 to FIG. 6, and thereby the safety can be maintained further.

As shown in FIG. 7, a cell pack 19 is constituted such that two holders 11 constituted of resin moldings having high electrical insulative property sandwich cells 10 in a vertical direction with respect to the circumferential direction of the cells 10, namely a longitudinal direction of the cells, and four cells 10 are connected electrically in series by being spot welded with metal bus bars with each other. Further, to the cell pack 19, voltage detecting lines 58 (refer to FIG. 10) for detecting voltages of the cells 10 and adjusting the voltages (capacity as a charge/discharge state of the cells 10) are connected. The metal bus bars are gathered on one of the holders 11 (the left side one shown in FIG. 7) via a not-shown flexible substrate constituting the voltage detecting lines 58. For improving workability, the metal bus bars and the not-shown flexible substrate are connected in advance before assembly of the cell pack 19. In other words, a plurality of conducting lines constituting the voltage detecting lines 58 are print-coated on the flexible substrate, with one ends of the conducting lines being connected to the metal bus bars, and the other ends thereof being gathered to a connector.

Also, the cells 10 are held (fixed) by holders 11 so that external terminals are located on a side face of the cell pack 19. By arranging the cells 10 so that the circumferential faces of the cells oppose each other, the cell pack 19 is constructed compactly. Further, the cells 10 are arranged such that the external terminals of the four cells 10 connected in series are arranged regularly in the same direction (refer to numerals 12, 13). Such an arrangement and a structure enable to maintain safety in addition to improvement of workability, and are also favorable in an aspect of maintenance. Shock resistance in a state of being mounted in a vehicle also improves, and it is also favorable against mechanical shock in a traffic accident of a vehicle.

As shown in FIG. 3 to FIG. 7, at two vertical positions between the holders 11, arch-shape louvers 36 are arranged respectively, which define the distance between the holders 11 and have a U-shape cross section for allowing distribution of cooling air on the outer circumferential face sides of the cells 10. Further, at the center between the holders 11, a cross-shape louver 37 is arranged, which defines the distance between the holders 11 and has a cross-shape cross-section for allowing distribution of cooling air on inner circumferential face sides of the cells 10 (refer to FIG. 6). Note that a part of the flexible substrate is fixed to the cross-shape louver 37 along a longitudinal direction of the cross-shape louver 37 to the side of the other holder 11 (on the right side shown in FIG. 7) opposite to the one holder 11 to which the connector is fixed. A vehicle in which the power supply system of to this embodiment is mounted will be used under various severe environmental conditions. The above-described structure of distributing the cooling air can suppress increasing of temperature while being used under severe environmental conditions, and is excellent in terms of realizing both size reduction and efficient cooling of an apparatus.

On one of the holders 11, an inter-cell bus bar 39 for connecting the cells 10, a positive electrode bus bar 12 for a positive electrode output, and a negative electrode bus bar 13 for a negative electrode output are insert molded. Further, nuts for fastening by screws are inserted in the positive electrode bus bar 12 and the negative electrode bus bar 13. Also, on the other holder 11, two inter-cell bus bars are insert molded in a direction crossing the inter-cell bus bar 39. Therefore, by spot welding these bus bars and the cells 10, the cell pack 19 in which four cells 10 are connected in series can be constructed. Note that as will be described later, temperature sensors TH1 to TH4 (refer to FIG. 10) such as thermistors are attached to cells 10 constituting a certain cell pack 19, and from this cell pack 19, detecting lines 58 from the temperature sensor are also led out besides the voltage detecting lines 58 and gathered to the connector thereof.

The above-described structure of the cell pack and arrangement relationship of the voltage and temperature detecting lines 58 are excellent in workability, and also excellent for size reduction of an entire apparatus. Also, the cell pack with this structure can be commonly used in other types of power supply systems, which results in improvement of productivity. Further, the structure is also excellent in welding workability for cells, and since electrical connection is made by welding operation, an electrical connection state can be maintained favorably for a long period of time. Therefore, safety and reliability with respect to mechanical vibration and shock are maintained even though high current flows therein.

<<Cell Pack Blocks>>

Figure 3:
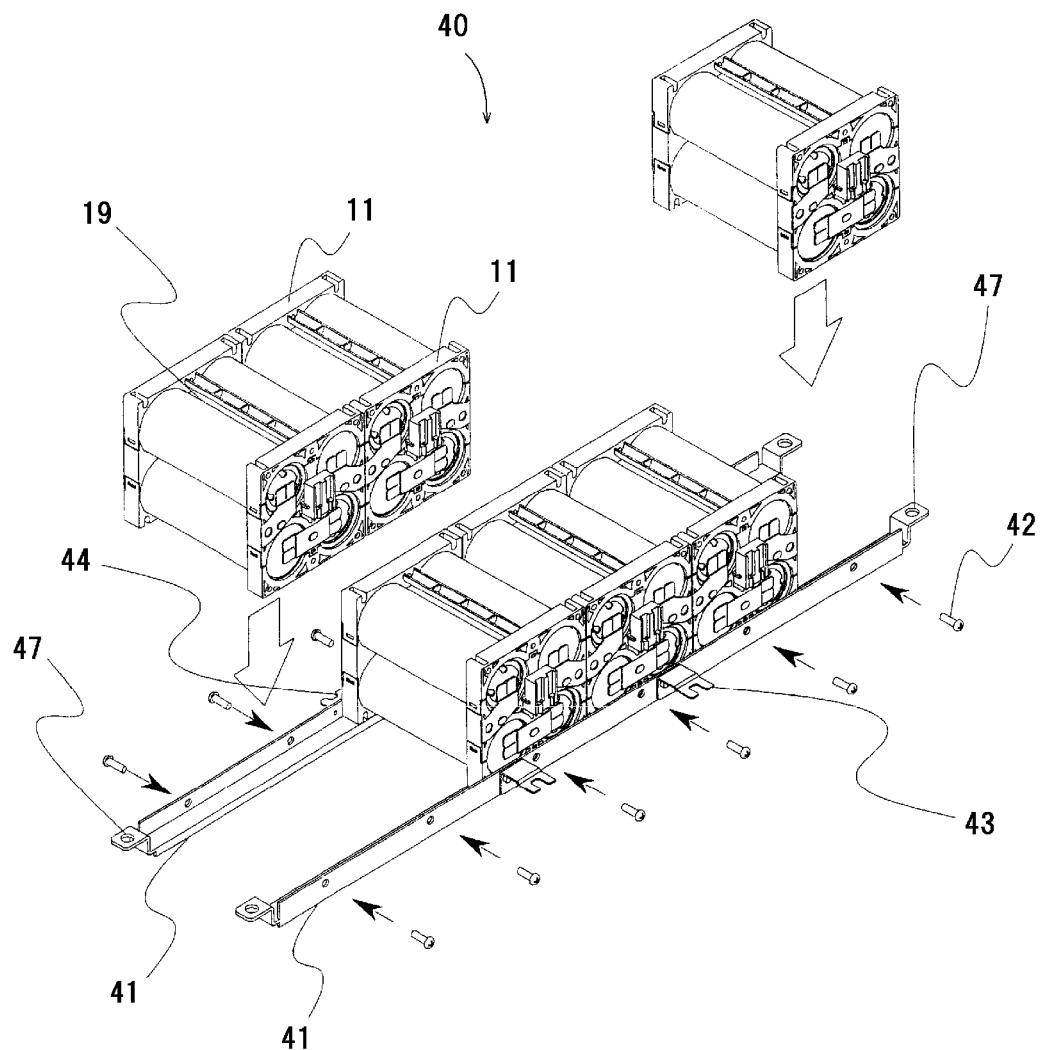
FIG. 3 is a perspective view showing an assembly state of a cell pack block in which cell packs are assembled.
Figure 4:
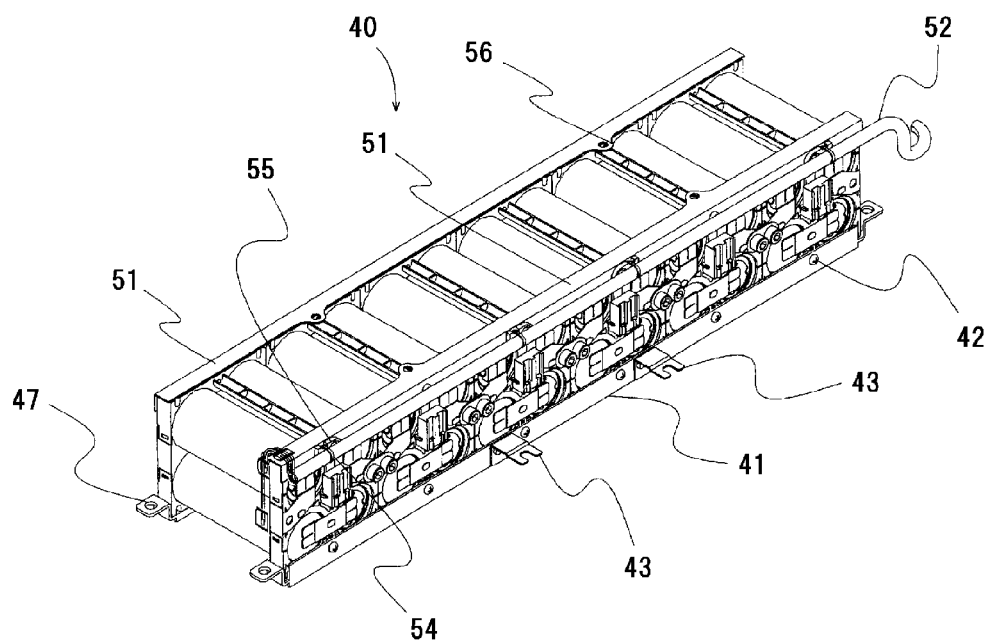
FIG. 4 is an exterior perspective view of the cell pack block.

As shown in FIG. 3 and FIG. 4, in this embodiment, for improving assembly performance and convenience in handling of the battery module 9, a plurality (six in this embodiment) of cell packs 19 are arranged on two channel-shape block bases 41, which each have a substantially h-shape cross-section and are arranged so as to oppose each other, and are fixed with tapping screws 42 engaging with fixing holes (female screw parts) formed in the holders 11. Thus a cell pack block 40 is assembled, in which a serial connection is made by inter-cell pack bus bars, which fasten the negative electrode bus bars 13 and the positive electrode bus bars 12 of adjacent cell packs 19 with each other. Therefore, workability for the structure to fix a plurality of cell packs 19 to the block bases 41 in parallel improves. Also, productivity of the cell packs 19 improves, thereby enabling a structure and dimensional relationship in common with cell packs in other power supply systems. The cell pack block is also excellent for detection of cells for quality management and for maintenance after production.

As shown in FIG. 3, the block base 41 has a plurality of flanges 43 and 44 projecting from side faces thereof to laterally fix the cell pack block 40 to the lower cover 45 (refer to FIG. 5). There are two types of these flanges, and for convenience, ones located on the outside of the battery module 9 are referred to as block flanges 43, and ones located on the inside thereof are referred to as block flanges 44. In other words, when it is assumed that a face located on the outside of the battery module 9 is a face to which the connector of the cell pack 19 is fixed, the block flanges 43 are disposed on the block base 41 on this face. The block flanges 43 are sandwiched by the lower cover 45 and the upper cover 46 (refer to FIG. 2 and FIG. 6), and the block bases 41 are fastened and fixed simultaneously as fastening of the lower cover 45 and the upper cover 46 (also refer to FIG. 2). Also, on both ends of the block bases 41, block base circular holes 47 are formed for fixing the cell pack block 40 on the lower cover 45 from front and back sides. Such a structure or arrangement is excellent in workability and productivity.

As shown in FIG. 4, on an upper part of the cell pack block 40, block reinforcing plates 51 having a substantially L-shape cross section and a channel shape are arranged in parallel with the block bases 41. The cell packs 19 are fixed laterally to the block reinforcing plates 51 from a front face side and a rear face side by tapping screws 42. On the block reinforcing plate 51 on the side where the connector is fixed, a detection harness 52 is fixed, which is connected to the voltage and temperature detecting lines 58 of the respective cell packs 19 constituting the cell pack block 40. Specifically, cable ties 55 for attaching tie bands 54 are fixed to one of the block reinforcing plates 51 by the tapping screws 42, and the detection harness 52 is fixed to the block reinforcing plate 51 by the tie bands 54. Further, the block reinforcing plates 51 have block reinforcing plate curving portions 56 curving at two positions and have circular holes formed therein. Hooks made of thick wire are inserted in these circular holes for handling, such as carrying the cell pack block 40. With this structure, strength of the cell pack blocks 40 constituted by fixing a plurality of cell packs 19 increases. Also, mechanical strength is maintained against vibration and shock with respect to the detection harness 52 connected to the voltage and temperature detecting lines 58 of the respective cell packs 19, and further, the structure is excellent in workability for electrical connection.

<<Battery Module>>

As shown in FIG. 5, the lower cover 45 is constituted of six types of parts: a lower cover base 61, a (cooling air) introducing side fixing table 62, a (cooling air) discharging side fixing table 63, block fixing bases 64, a reinforcing louver 65, and center poles 66.

The lower cover base 61 constitutes a front face, a bottom face, and a back face of the module case 9a. On a front face portion of the lower cover base 61, circular holes for taking out a positive electrode high voltage cable 81 and a negative electrode high voltage cable 82 (refer to FIG. 2) are formed respectively on both sides of the center thereof, and on a lower side thereof, a slit-shape intake 14 for introducing cooling air is formed. Further, an upper face side and side ends of left and right side faces of the front face portion of the lower cover base 61 are bent in an L shape. On the other hand, on a lower side of a back face portion of the lower cover base 61, a slit-shape exhaust port 15 for exhausting cooling air is formed at a position corresponding to the intake 14 formed in the front face portion (refer to FIG. 1, FIG. 6). From a bottom face portion of the lower cover base 61, lower cover flange portions 68 are extending outward laterally from the left and right sides, which are located higher than the bottom face of the lower cover base 61 and have a substantially horizontal face. On end portions of the lower cover flange portions 68, bent ribs 69 which are bent upward are formed respectively.

On the front face portion side of the bottom face portion of the lower cover base 61, the introducing side fixing table 62 for fixing the block bases 41 of the cell pack block 40 from the front face side, and guiding the cooling air introduced from the intake 14 to the reinforcing louver 65 is fixed (also refer to FIG. 6). On the other hand, on the back face portion side of the bottom face portion of the lower cover base 61, the discharging side fixing table 63 are fixed for fixing the block bases 41 of the cell pack block 40 from the back face side, and guiding the cooling air distributed through the battery module 9 to the exhaust port 15 via two discharge ports 72 formed in an upper face thereof (also refer to FIG. 6). Also, along the center in a longitudinal direction of the bottom face portion of the lower cover base 61, the center poles 66 (also refer to FIG. 2) for supporting a center portion in the longitudinal direction of the upper cover 46 and coupling (fastening by screws) to the upper cover 46 and the block fixing bases 64 for fixing the block flanges 44 of the block base 41 of the cell pack block 40 are fixed alternately. With this structure, an excellent cooling characteristic can be obtained despite that the entire shape has a relatively small size.

Further, on the lower cover base 61, the reinforcing louver 65 is fixed for reinforcing strength of the bottom face of the lower cover base 61 and for supplying cooling air to each of the cell pack blocks 40. The center in a longitudinal direction of the reinforcing louver 65 is in contact with the bottom face portion of the lower cover base 61, and circular holes and rectangular holes for inserting the center poles 66 and the block fixing bases 64 fixed to the lower cover base 61 are formed therein. Both sides sandwiching the center in the longitudinal direction of the reinforcing louver 65 are one step higher (hereinafter, these portions are referred to as duct forming portions), and these portions forms with the lower cover base 61 ducts 75 having a rectangular-shape opening cross-section. In the duct forming portions of the reinforcing louver 65, rectangular ventilation holes 76 are formed at positions corresponding to positions between the cells 10 constituting the cell packs 19 (also refer to FIG. 6). A substantially half of an opening area of the closest ventilation hole to the intake 14 is covered by a rib-shape blocking louver 77 which inclines obliquely. With the above-described structure, an excellent cooling effect can be obtained with a small number of parts.

Both lateral sides of the duct forming portions of the reinforcing louver 65 are, similarly to the center in the longitudinal direction, in contact with the bottom face portion of the lower cover base 61. Ends on both lateral sides of the reinforcing louver 65 stand up, and further the flange portions having a substantially horizontal face extend outward laterally from the left and right sides. The flange portions of the reinforcing louver 65 are in contact by surface with the lower cover flange portions 68 of the lower cover base 61 and fixed thereon. Also, the reinforcing louver 65 is cut out in the front face and back face portions so as to avoid positions of the introducing side fixing table 62 and the discharging side fixing table 63 fixed to the lower cover base 61. Note that an end on the introducing side fixing table 62 side of the duct forming portions of the reinforcing louver 65 is inserted in the introducing side fixing table 62 so that the ducts 75 communicate with the intake 14 (also refer to FIG. 6). With such a structure and a configuration, an excellent cooling characteristic can be obtained.

As shown in FIG. 2 and FIG. 3, two cell pack blocks 40 are fixed in parallel on the lower cover 45. Specifically, stud bolts 78 (refer to FIG. 5) formed to stand on the introducing side fixing table 62 and the discharging side fixing table 63 are inserted in the circular holes 47 on the both ends of the block bases 41 of the respective cell pack blocks 40, and are fixed by nuts including springs. Also, the block flanges B44 of the block bases 41 of the cell pack block 40 are fixed together by nuts including springs so as to oppose each other on the block fixing bases 64. By disposing two cell pack blocks in parallel, the entire battery module becomes relatively small.

Figure 9:
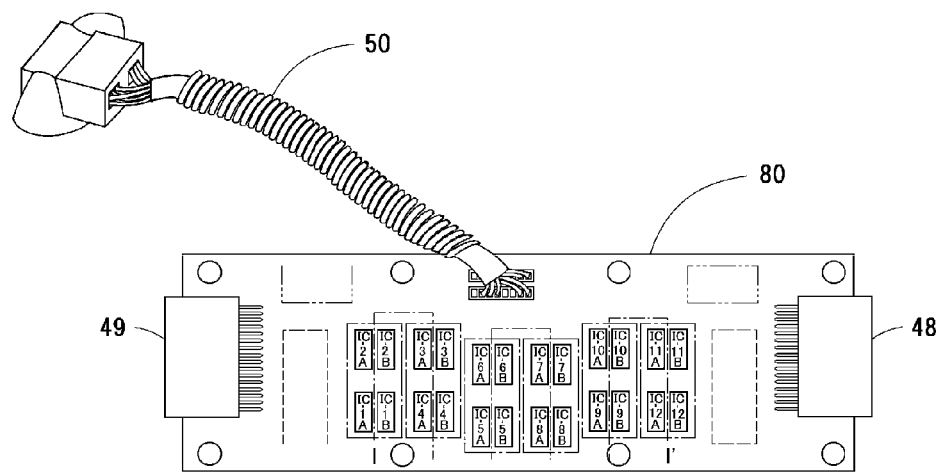
FIG. 9 is a plan view schematically showing a substrate constituting a cell controller, partially including a perspective view.

In FIG. 6 and FIG. 9, on the discharging side fixing table 63, a cell controller box (C/C box) 79 including a cell controller (hereinafter, abbreviated to C/C) 80 shown in FIG. 9 is fixed to the lower cover base 61 (refer to FIG. 5) by screws. As shown in FIG. 9, the C/C 80 is constituted of a single substrate which is laterally long and has printed wirings on both faces, and is fixed in a standing state by screws via circular holes formed at four respective vertical positions inside the C/C box 79. The substrate having ICs is arranged in a relationship to oppose side faces of the cells constituting the cell packs, and with such a structure, the entire module can be accommodated in a relatively small space. Also, complexity in wirings of the respective cell packs and the C/C 80 can be eliminated.

Connectors 48, 49 for connecting to the cells constituting the battery block 40 via the detection harness 52 are provided on ends on both left and right sides of the substrate constituting the C/C 80 with a distance therebetween. A harness connector (not shown in FIG. 4) attached to one side, which is the substrate side, of the detection harness 52 is connected to the connectors 48, 49 of the C/C 80. Specifically, as shown in FIG. 2, the detection harness 52 is led out for each of the cell pack blocks 40, and as described above, since two cell pack blocks 40 are accommodated in a battery module 9, two connectors 48, 49 are mounted on the C/C 80. By arranging connectors respectively for the two cell pack blocks, the wiring operation becomes simple. Also, maintenance can be performed easily. One of the connectors 48, 49 is used for connection to a high voltage side cell in the cells connected in series, and the other one of the connectors 48, 49 is used for connection to a low voltage side cell in the cells connected in series. Thus, the connection of the cells connected in series and the C/C 80 is divided into a plurality of connections based on potentials of the cells connected in series, and connections of the cells and the C/C 80 are made using a plurality of connectors corresponding to the aforementioned division according to potential states. Accordingly, potential differences in connections by the respective connectors can be made small. With such a structure, excellent effects can be obtained regarding withstanding voltage, leakage of current, as well as dielectric breakdown. Also, in connecting or releasing operation of each connector, it is difficult to connect or release the entire connector simultaneously, and a partial connection state is generated in the process of connecting or releasing. In the above structure, the voltage difference held by each connector can be made small, and thus electrical adverse effect due to a partial connection generated in the process of connecting or releasing can be suppressed.

Also, on the substrate of the C/C 80, a plurality of ICs are prepared for the serial connection of cells accommodated in the battery module 9. The number of cells handled by one IC is determined depending on the processing ability of each IC. In this embodiment, as will be described later with reference to FIG. 10, one IC is used for four cells. However, one IC may be used for five or six cells. Also, in the same system, a part in which one IC is used for four cells and a part in which one IC is used for six cells may be combined. The number of cells connected in series is not limited to a multiple of an optimum number which can be handled by each IC. That is a multiple of four in this embodiment, but since it is normally not limited to the multiple of four, a situation such that the number of cells handled by one IC is different within the same system occurs. However, it would not be a big problem.

The cells connected in series are divided into a plurality of groups based on the number of cells handled by one IC, a corresponding IC is determined for every group, and the corresponding IC measures terminal voltages of the cells constituting a corresponding group. As described above, numbers of cells constituting the respective groups may be different.

In this embodiment, the number of cells which the cell pack 19 has and the number of cells handled by one IC correspond by coincidence, and terminal voltages of the cells are measured by 12 ICs corresponding to 12 cell packs 19. For increasing the reliability further, doubled systems of circuit arrangements are formed, and hence 24 ICs IC-1A to IC-12B are mounted corresponding to 12 cell packs 19 as will be explained below. These ICs are mounted in order corresponding to the cell packs 19, but details thereof will be described later with a circuit diagram.

Also, a communication harness 50 for communicating with a battery controller 20 (refer to FIG. 17) is led out from the substrate of the C/C 80, and the communication harness 50 has a connector on a tip portion thereof. This connector is connected to a connector (not shown) on the battery controller 20 side. Note that although chip elements such as resistors, capacitors, photo couplers, transistors, diodes, and so on are mounted on the substrate of the C/C 80, these elements are omitted in FIG. 9 for avoiding complexity. On the substrate of the C/C 80, the connectors 48, 49 are provided respectively for the two cell pack blocks, and the communication harness 50 for communicating with the battery controller 20 is provided separately from these connectors. By providing the connectors 48, 49 and the communication harness 50 separately in this manner, the wiring operation becomes simple, and also maintenance becomes simple. Also, as described above, since one of the connectors 48, 49 connects the cells connected in series on the high voltage side and the substrate of the C/C 80, and the other one of the connectors 48, 49 connects the cells on the low voltage side connected in series and the substrate of the C/C 80, the voltage difference in a range held by each connector can be made small. When connecting or releasing the connectors, a partial connecting state in which only a part thereof is connected is generated momentarily, but since the voltage difference in the range held by each connector can be made small, an adverse effect brought about by the partial connecting state can be made small.

The cell pack blocks 40 arranged and fixed in parallel on the lower cover 45 are connected with each other in series by block connecting bus bars, which are omitted in the drawing. Grommets are fixed to the circular holes formed in the front face portion of the lower cover base 61, through which a positive electrode high voltage cable 81 and a negative electrode high voltage cable 82 are led out respectively (refer to FIG. 2). In this manner, the battery module 9 has 12 cell packs 19 connected in series and constitutes a battery with a nominal voltage of 170 V and a capacity of 5.5 Ah. However, the lithium secondary cells change in terminal voltage according to charge states, and actual terminal voltages will change based on the charge states.

Note that in respective groups in which cells connected in series are grouped based on corresponding ICs, from one having a high potential to one having a low potential, a group on the highest potential side is represented by group AB1, a group having a next highest potential is represented by group AB2, ..., and a group on a lowest potential side is represented by group AB12. Also, a cell 10 having a highest potential in cells constituting the group AB1 on the highest potential side is represented by cell B1, a cell 10 having a next highest potential in the group AB1 is represented by cell B2, ..., a cell 10 having a lowest potential on the group AB12 on the lowest potential side is represented by cell B48, and a cell 10 having a next lowest potential in the group AB12 is represented by a cell B47. These cells will be explained with symbols being added in order from the highest potential side to the lowest potential side (refer to FIG. 10).

Also, in this embodiment, the cell packs 19 and the groups correspond. This is because measurement of terminal voltages of four cells and balance adjustment of charge states are performed by one IC. By managing four cells by one IC, the number of cell packs and the number of groups correspond, but they need not necessarily correspond. A different number of cells, six cells for example, may be managed by one IC. In the case of six cells, the battery packs and the groups do not correspond.

Also, in this embodiment, the aforementioned temperature sensors are arranged in four cell packs 19 corresponding to the groups AB1, AB2, AB11, AB12, and for example provided respectively on a cell 1 (B1, B5, B41, B45) on the highest potential side in each of the cell packs 19 corresponding to these groups.

Figure 16:
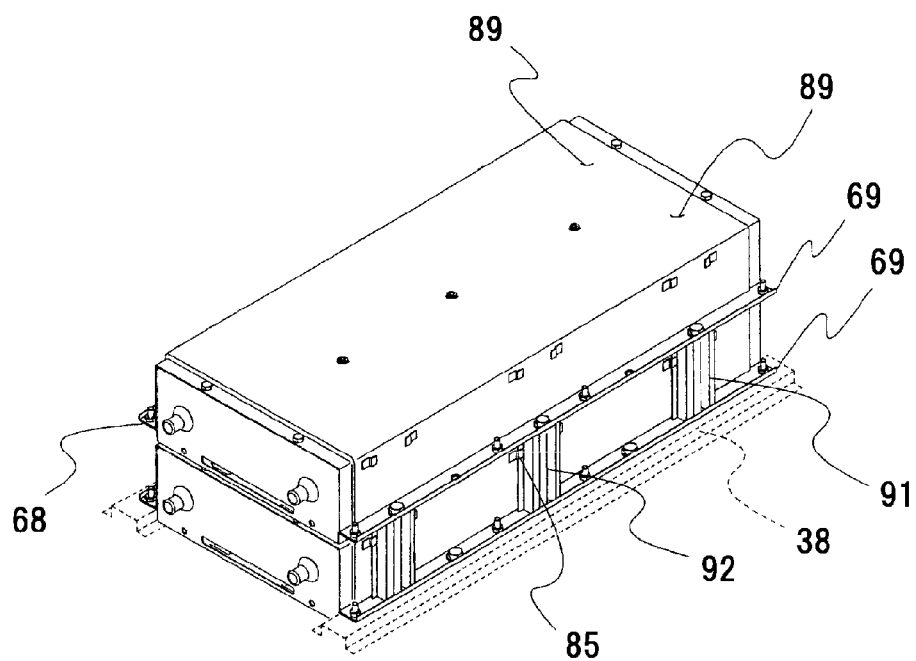
FIG. 16 is an exterior perspective view showing a fixed state of the battery module in the power supply system.

As shown in FIG. 2, the upper cover 46 constitutes a left side face, an upper face, and a right side face of the module case 9a. The upper cover 46 has a characteristic shape, and has upper cover narrow portions 84 formed by narrowing front face and back face sides. Specifically, both ends of the left side face, the upper face, and the right side face of the upper cover 46 are bent and narrowed toward the front face side and the back face side of the lower cover base 61 respectively, so as to increase durability in a torsional direction of the entire module case 9a. Also, on left and right side faces of the upper cover 46, collar guides 85 restricting movement of collars 91 (refer to FIG. 16) which will be described later are welded. From left and right sides of the upper cover 46, upper cover flange portions 86 each having a substantially horizontal face extend outward. On the upper cover flange portions 86, flange portion recesses 87 are formed so as to avoid the block flanges A43 in a state that the block flanges A43 projecting from the block bases 41 are placed on the lower cover flange portions 68.

The lower cover flange portions 68 and the upper cover flange portions 86 are fastened by screws and stud bolts. Also, the front face portions and the back face portions of the upper cover narrow portions 84 and the lower cover base 61 are fastened by screws. Note that the upper cover narrow portions 84 form steps from the upper face of the upper cover 46, and thus screw heads after being fastened do not projects from the upper face of the upper cover 46 (also refer to FIG. 1). Further, female screws are formed on top portions of the center poles 66 provided to stand up on the lower cover base 61, and the upper cover 46 and the lower cover 45 are fastened by screws also at these positions. As described above, the module case 9a has a structure with high mechanical strength against a force in a torsional direction. Also, the structure can be easily assembled and is excellent in productivity.

<Cooling System of the Battery Module>

Figure 17:
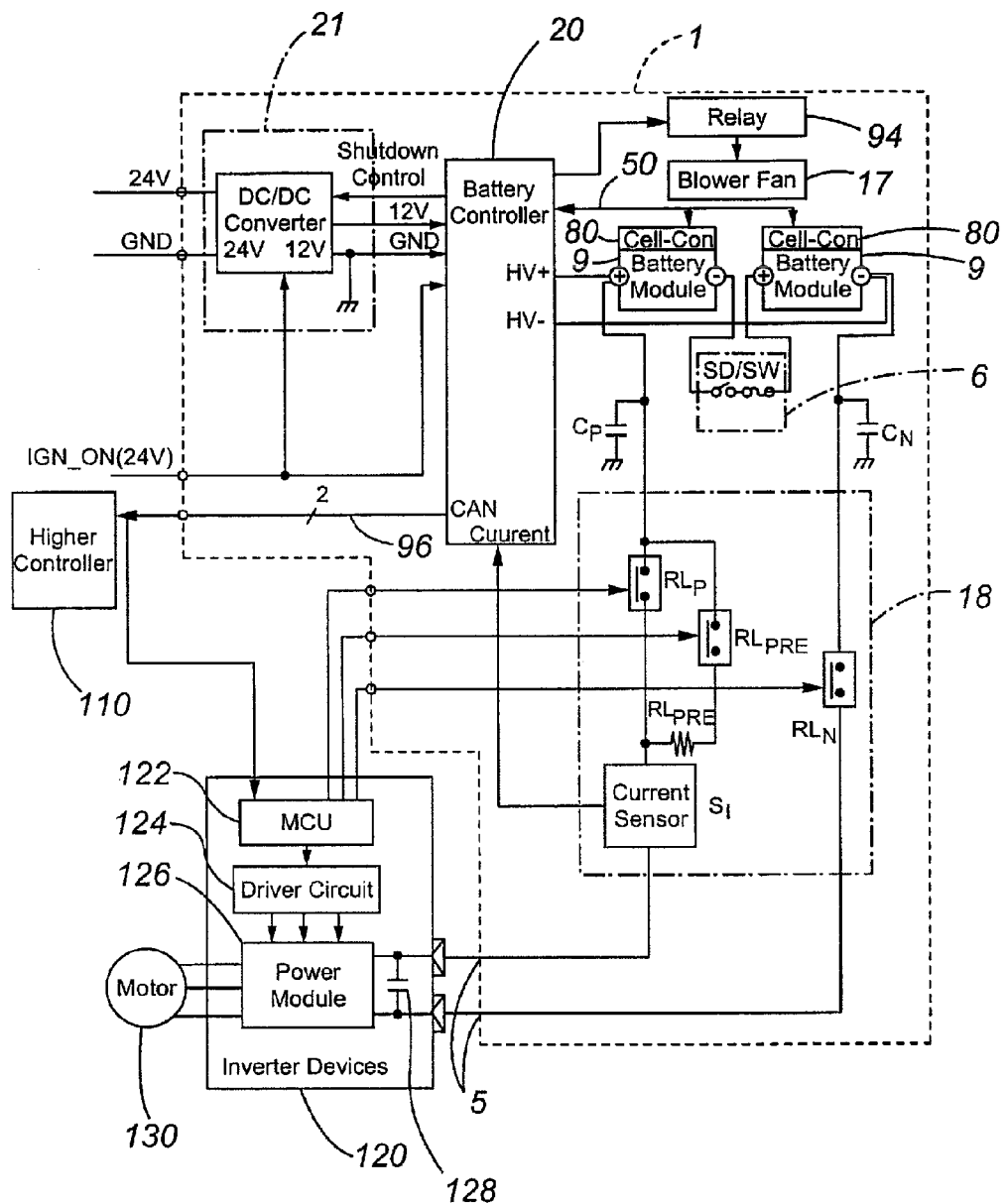
FIG. 17 is a block circuit diagram showing a driving system of a vehicle.

As shown in FIG. 6, the battery module 9 adopts a forcible cooling method to cool the respective cells 10 forcibly with cooling air by a blower fan 17 (refer to FIG. 17). Specifically, the cooling system of the battery module 9 has a structure such that cooling air introduced from the intake 14 passes through the inside of the introducing side fixing table 62 of the lower cover 45, flows through the ducts 75 formed by the reinforcing louver 65 and the lower cover base 61 and corresponding to the respective cell pack blocks 40, passes through the respective ventilation holes 76 formed in (the duct forming portions of) the reinforcing louver 65, flows around the respective cells 10 constituting the respective cell packs 19 and converges in the space formed with the upper cover 46, passes from the discharge ports 72 formed in the upper face of the discharging side fixing table 63 through a lower side of the C/C box 79 to exit via the exhaust port 15. With such a structure, the battery module 9 has a structure which is compact and further has an excellent cooling effect.

The above-described arch-shape louver 36 and cross-shape louver 37 have a function as a support post between the two holders 11 constituting the cell pack 19, and a function as an inner louver. Here, important points for cooling are positions of the ventilation holes 76 formed in the reinforcing louver 65 and opening areas thereof. In this embodiment, the blocking louvers 77 are provided in the ventilation holes 76 which are located on the introducing side, for example which are closest to the introducing side, in intermediate portions the opening areas of the ventilation holes 76 are made smaller with distance from the introducing side, and areas of the ventilation holes 76 which are located on the exhaust side, for example which are closest to the discharging side are made large. With this structure, an excellent cooling effect can be obtained.

Since the cooling air which exchanged heat by forcible cooling converges on the discharging side, sending a large amount of cooling air having a low temperature has a large effect in addition to the method of increasing flow speed by narrowing the opening areas of the ventilation holes 76. For example, an optimum cooling system can be constructed by setting a ratio of the opening areas of the ventilation holes 76 to 0.7, 0.25, 0.4, 0.7, 0.8, 1.0, 1.0, 1.0, 1.0, 1.0, 0.65 from the exhaust side, assuming that the center one is 1.0.

<Cell Controller>

As described above, the C/C 80 has a plurality of ICs, for example 24 ICs IC-1A to IC-12B in this embodiment. These ICs are provided corresponding to the groups AB1 to AB12 respectively. Specifically, IC-1A, IC-1B correspond to the group AB1 on the highest potential side, IC-2A, IC-2B correspond to the group AB2 having a next highest potential, and IC-12A, IC-12B correspond to the group AB12 on the lowest potential side. In this embodiment, mainly for ensuring reliability of overcharging detection of the cells 10 (lithium secondary cells), there are used two identical ICs, IC-1A and IC-1B corresponding to the group AB1, IC-2A and IC-2B corresponding to the group AB2, IC-12A and IC-12B corresponding to the group AB12, respectively. Using two ICs for each group, a doubled system is made to increase reliability. Note that the IC-1A and the IC-1B, the IC-2A and IC-2B, ..., IC-12A and IC-12B may each be made as one IC to constitute all the ICs by half, 12 ICs.

Figure 10A:
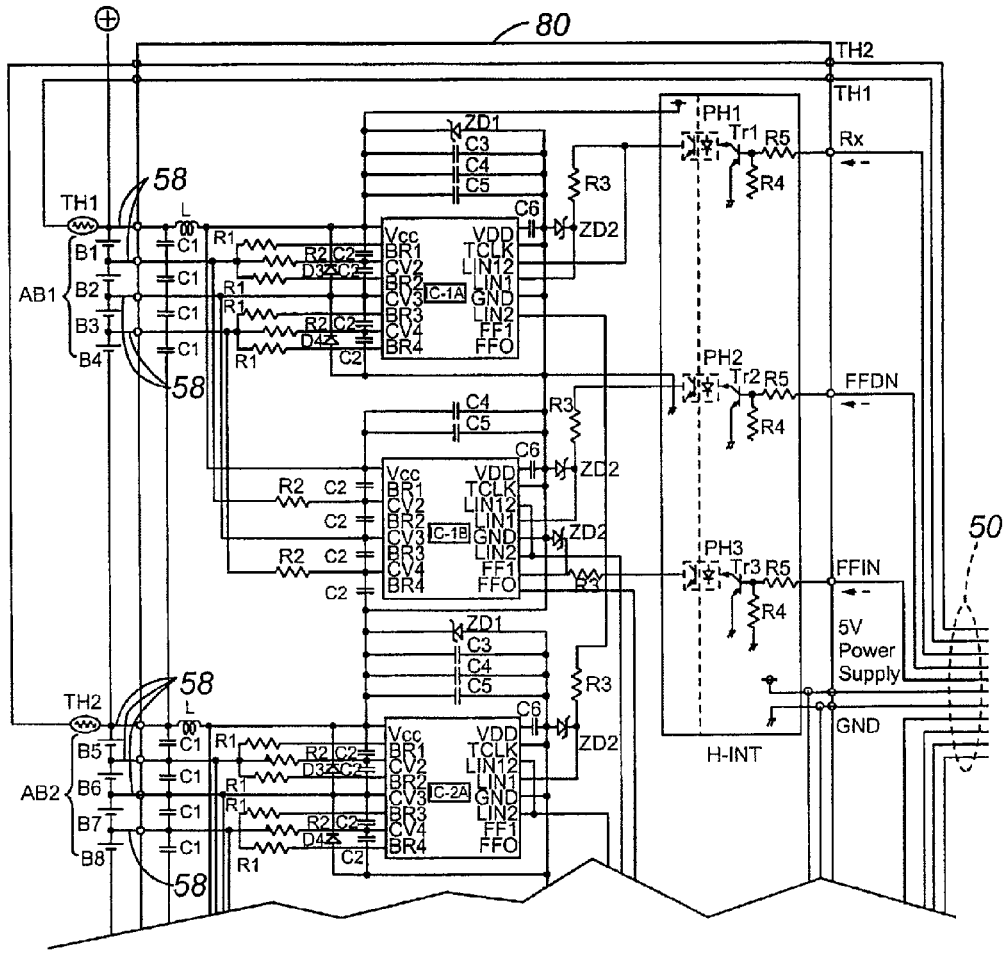
FIGS. 10 (A) to 10 (B) are circuit diagrams of the cell controller.
Figure 10B:
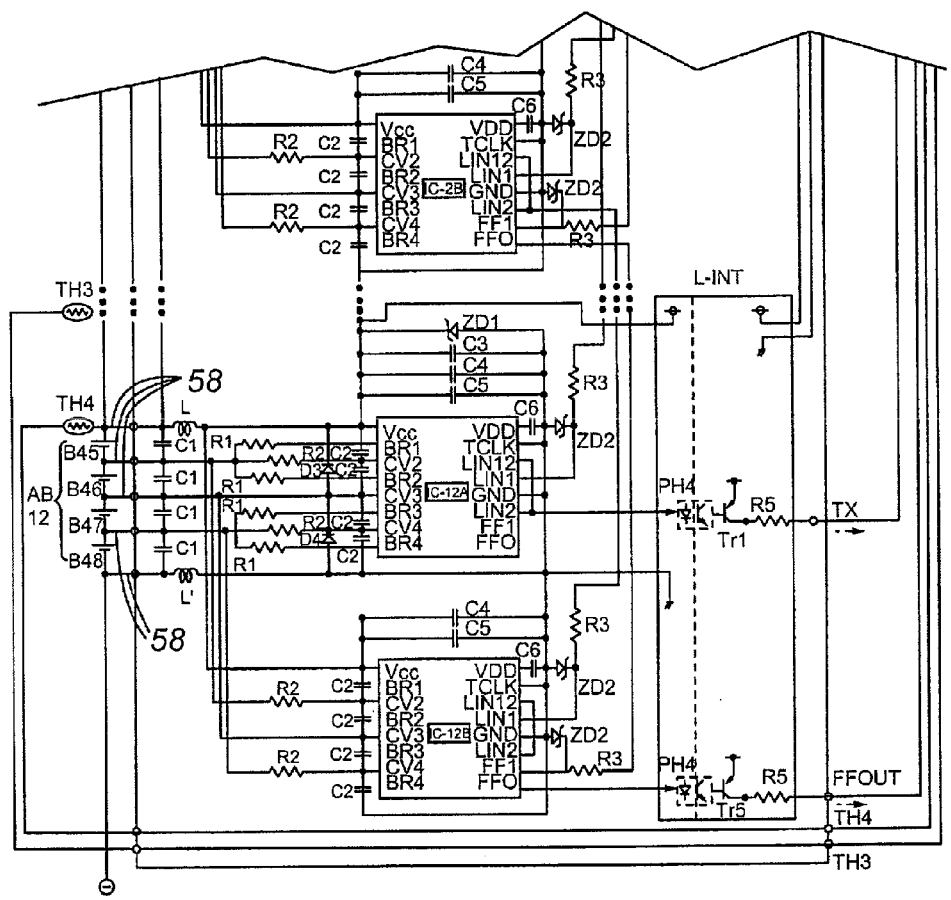

As shown in FIG. 10, the IC-1A, IC-2A, ..., IC-12A with "A" being added to the end (hereinafter, they are referred to as A-group ICs generically) have a function to detect voltages of the cells B1 to B4, B5 to B8, ..., B45 to B48 constituting the respective corresponding groups AB1, AB2, ..., AB12 and a function to on/off control internal switch elements (refer to symbols SW1 to SW4 of FIG. 11) so that capacity adjusting resistors R1 for adjusting capacities of cells B1 to B48 separately are connected in parallel to the cells, which are targets of capacity adjustment, for uniformizing the capacities of all the cells B1 to B48. On the other hand, the IC-1B, IC-2B, ..., IC-12B with "B" being added to the end (hereinafter, they are referred to as B-group ICs generically) have a function to detect overcharging (FF) of the cells B1 to B4, B5 to B8, ..., B45 to B48 constituting the respective corresponding groups AB1, AB2, ..., AB12 of cells. However, the function to detect overcharging (FF) may also be given to the IC-1A, IC-2A, ..., IC-12A with "A" being added to the end. In this manner, the ICs with "B" being added to the end are completely for backing up.

The ICs each have terminals Vcc, BR1, CV2, BR2, CV3, CV4, BR4, VDD, TCLK, LIN12, LIN1, GND (ground), LIN2, FFI, FFO, and are constituted of identical circuits. In other words, the A-group ICs and the B-group ICs are constituted of ICs having the same circuit structure.

Next, a connection structure related to the IC-1A will be explained. Between respective positive and negative electrodes of the cells B1 to B4 constituting the group AB1 on the highest potential side, capacitors C1 (1 nF in this example) for eliminating noise on a high frequency side are connected in parallel respectively. Between the Vcc terminal and the CV2 terminal, between the CV2 terminal and the CV3 terminal, between the CV3 terminal and the CV4 terminal, and between the CV4 terminal and the GND terminal, capacitors C2 (100 nF in this example) for suppressing noise of a low frequency side relative to the capacitors C1 are inserted, respectively. Specifically, the capacitors C1 are provided on the cell side of an inductance L which will be described below and the capacitors C2 are provided on a voltage detecting circuit side of the inductance L so as to eliminate the noise of the high frequency side on the cell side of the inductance L and eliminate the noise of the low frequency side from the capacitors C1 on the voltage detecting circuit side of the inductance L. Capacities of the capacitor C1 are smaller than capacities of the capacitor C2. With the above structure, influence of noise generated by the inverter device which converts direct current power to alternate current power can be reduced.

The Vcc terminal is connected to the positive side of the cell B1 via an inductor L (22 μH in this example). Note that for the inductor L, for example one having a few μH (2 μH for example) to about 100 μH can be used. The BR1 terminal is connected to the negative electrode (positive electrode of the cell B2; as is clear from FIG. 10, since the negative electrode of the cell on the upper side and the positive electrode of the cell on the lower side, which are connected in parallel, have the same potentials, hereinafter only negative electrodes of cells on the upper side will be explained) of the cell B1 via a capacity adjusting resistor R1 (for example, 200Ω), and the CV2 terminal is connected to the negative electrode of the cell B1 via a resistor R2 (100Ω in this example) constituting an RC filter with the capacitors C1, C2, and the BR2 terminal is connected to the negative electrode of the cell B1 via the capacity adjusting resistor R1. Here, capacity adjustment means to adjust the charge/discharge states of the cells 10 connected in series so as to uniformize them. In this embodiment, the charge/discharge states of the cells 10 are controlled to be the same. For example, it becomes possible that a cell having a charge amount larger than other cells is discharged via the capacity adjusting resistor to be adjusted to have the same state of charge (SOC) as other cells. By keeping the cells 10 in the same state of charge, it is possible to prevent a certain cell to be overcharged even when the state of charge of each cell becomes close to a full charge.

The CV3 terminal is connected directly to the negative electrode of the cell B2. The BR3 terminal is connected to the negative electrode of the cell B3 via a capacity adjusting resistor R1, the CV4 terminal is connected to the negative electrode of the cell B3 via a resistor R2, and the BR4 terminal is connected to the negative electrode of the cell B3 via the capacity adjusting resistor R1. Note that resistance values and functions of the resistors R1, R2 are the same as those explained above. Hereinafter, resistance values of resistors as well as capacities and functions of capacitors which are designated by the same symbols are the same as in the contents already explained about the same symbols, and explanations thereof are omitted.

Also, a schottky diode D3 is inserted between the CV3 terminal and the Vcc terminal, and a schottky diode D4 is inserted between the GND terminal and the CV3 terminal. Further, a capacitor C3 (1 μF in this example), a capacitor C4 (100 nF in this example) and a capacitor C5 (100 pF in this example) having different capacities are connected between the GND terminal and the Vcc terminal. These capacitors suppress noise which affects the IC-1A in a wide range. Also, a Zener diode ZD1 for suppressing noise entering the Vcc terminal is inserted between the GND terminal and the Vcc terminal Note that the Vcc terminal of each IC is connected to the terminal with a voltage of the highest order in the corresponding group of cells. Also, the GND terminal of each IC is connected to the terminal with a voltage of the lowest order in the corresponding group of cells. For example, in the IC-1A, the Vcc terminal is connected to a positive electrode of the cell B1 of the group AB1, and the GND terminal is connected to the negative electrode of the cell B4 of the group AB1. By connecting in this manner, operational power for the IC corresponding to each of the groups is supplied by all the cells of each of the groups, which are divided in groups, and hence the power consumption of the cells can be uniformized, thereby providing an effect leading to uniformization of the states of charge of the cells. Also, in this embodiment, the number of cells constituting a group is the same number, four in this example. Thus, by making numbers of cells constituting the respective groups the same, the operational power of the respective ICs are born by the respective cells evenly, thereby providing an effect leading to uniformization of the states of charge of the cells.

In FIG. 10, the communication harness 50 is connected to the higher-order battery controller 20. However, the battery controller 20 takes the chassis potential of a vehicle as ground (GND) potential and operates with a low voltage of 5 volts. On the other hand, each IC takes a lowest-order potential of cells constituting the corresponding group as GND potential and receives a highest-order potential in the corresponding group at the Vcc terminal to operate. Accordingly, the communication harness 50 connected to the battery controller 20 needs to be electrically insulated from the ICs. For making electrical insulation, insulation circuits are provided on the higher-order side and the lower-order side. A higher-order side interface is H-INT, and a lower-order side interface is L-INT. Parts shown by dotted line in these higher-order side interface H-INT and lower-order side interface L-INT are converted into light for transmitting information, and thereby electrical insulation is maintained.

Figure 11:
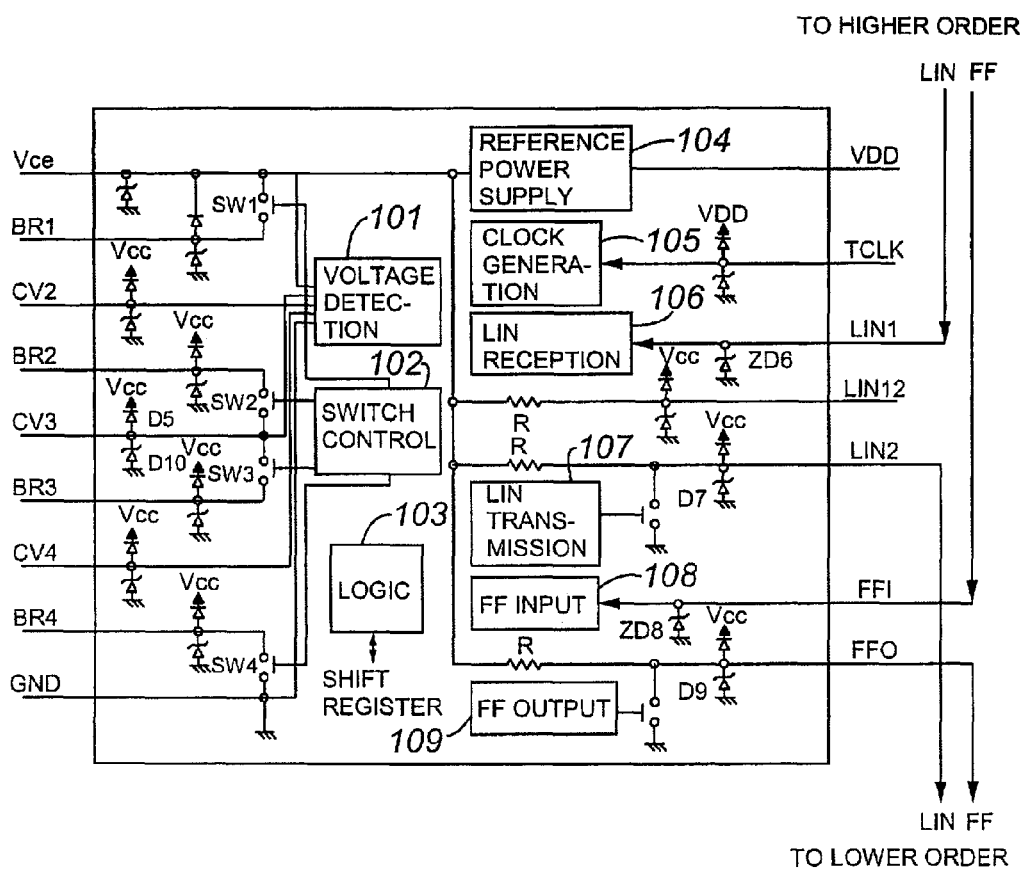
FIG. 11 is a circuit diagram of a protection circuit inside ICs constituting the cell controller.

A capacitor C6 (100 nF in this example) is inserted between the GND terminal and the VDD terminal (reference voltage terminal). The capacitor C6 is a capacitor for stabilizing an operating voltage of a logic circuit or the like in the IC-1A. A basic structure of the IC is shown in FIG. 11. A reference power supply circuit 104 receives the Vcc voltage supplied from the cells, and generates a constant voltage used for generating a voltage for operating a circuit in the IC and/or a reference voltage which becomes a reference for comparison. The voltage generated by this reference power supply circuit 104 is also used as an operating voltage of an analog-digital converter. Accordingly, it is desirable that the reference power supply circuit 104 generates a stable constant voltage in which influence of noise is eliminated as much as possible. For that purpose, it is necessary to connect a smoothing capacitor. Since it is not a good idea to provide a function of the smoothing capacitor in the IC circuit, the VDD terminal is provided and the capacitor C6 is connected between the aforementioned VDD terminal and the aforementioned GND terminal. The capacitor C6 is provided on the substrate of the C/C 80 explained with FIG. 9, and is connected to the VDD terminal and the GND terminal by wirings provided on the substrate of the C/C 80. The capacitor C6 is provided between the VDD terminal and the GND terminal as shown in FIG. 10, and a degree of influence of noise to the VCC power supply voltage and a degree of influence of noise to the power supply voltage generated by the reference power supply circuit 104 are different. Since strict noise measures are required for the power supply voltage generated by the reference power supply circuit 104, the VDD terminal is provided separately from a noise measure of the Vcc terminal so that more excellent noise measures can be performed. With this structure in which the VDD terminal is provided and the capacitor C6 is provided, there are effects such that detection accuracy of voltages of cells improves and thereby control accuracy of states of charge of the cells improves significantly.

The TCLK terminal is connected to the GND terminal and a function thereof is stopped. Note that the IC-1A takes a principle that does not need a common clock for transmission to an external circuit, and is made so that it does not need to receive a special external clock. For example, a method is adopted such that clocks are adjusted with each other at the time of starting transmission or reception, and a signal to be transmitted is transmitted or received thereafter. Thus, it is not necessary to receive a special clock signal from the outside, and thus the circuit becomes quite simple. Specifically, this embodiment has a circuit structure in which reference potentials of the ICs and the battery controller 20 are different respectively, and the reference potentials of the ICs are determined by respective lowest potentials of the cells which are divided into groups. Further, the terminal voltage of a lithium cell varies largely by a charge/discharge state, and the reference potentials (potentials of the GND terminals) of the ICs vary constantly. Therefore, it is not easy to provide a common clock circuit and supply this common clock to the ICs. In this embodiment, there is an effect that the entire system can be simplified since a common clock is not used.

The LIN12 terminal, the LIN1 terminal, and the LIN2 terminal are terminals for transmitting/receiving signals. Signal transmission between the battery controller 20 and the ICs is signal transmission between circuits having different potentials. A signal is transmitted to the IC-1A and the IC-1B on the higher potential side and the IC-12A and the IC-12B on the lower potential side using photo couplers for electrical insulation. On the other hand, between the IC-1A on the higher potential side and the IC-12A on the lower potential side or between the IC-1B on the higher potential side and the IC-12B on the lower potential side, communication is performed by a method of connecting input terminals and output terminals of the ICs in a loop respectively. The reception terminal LIN1 is connected to a reception terminal LIN2 of a respective adjacent IC via a resistor R3 (470Ω in this example) for reducing influence of noise. By connecting the transmission and reception terminals connected in a loop via resistors, noise transmitted via the loop of transmission/reception can be attenuated, and there is an effect for reducing the influence of noise generated by the inverter device.

Also, the LIN12 is a terminal for supplying a current to a load to which it is desired to supply a large current, and is connected directly to a collector on a photo transistor side of a photo coupler PH1 in the higher-order side interface H-INT for performing communication with the battery controller 20 in an insulated state. A transistor Tr1 and resistors R4, R5 for allowing stable operation of the transistor Tr1 are connected to a light-emitting diode side of the photo coupler PH1. The other end side of the resistor R5 is connected to the battery controller 20 via a LIN reception line (Rx) which constitutes the communication harness 50.

Between the GND terminal and the LIN1 terminal, a Zener diode ZD2 for protection against a surge voltage is inserted. The LIN2 terminal is connected (via a resistor R3) to the LIN1 terminal of the IC-2A as an A-group IC on the lower-order side. Therefore, the A-group ICs are connected in a loop (hereinafter, referred to as a daisy chain) respectively by the LIN12 terminal, the LIN1 terminal, and the LIN2 terminal. Note that the FFI terminal and the FFO terminal of the IC-1A are not used.

Next, a connection structure related to the IC-1B will be explained. When seen from the group AB1 side constituted of cells, the IC-1B of the B-group IC is connected in parallel to the IC-1A of the A-group IC, and this will be explained in detail as follows. Capacitors C2 are inserted between the Vcc terminal and the CV2 terminal, between the CV2 terminal and the CV3 terminal, between the CV3 terminal and the CV4 terminal, and between the CV4 terminal and the GND terminal, respectively. The Vcc terminal is connected to a positive electrode of the cell B1 via an inductor L. The CV2 terminal is connected to a negative electrode of the cell B1 via a resistor R2, the CV3 terminal is connected to the negative electrode of the cell B2, and the CV4 terminal is connected to a negative electrode of the cell B3 via a resistor R2. The GND terminal is connected to the GND terminal of the IC-1A. The capacitor C4 and the capacitor C5 are connected between the GND terminal and the Vcc terminal, respectively. Also, the capacitor C6 is inserted between the GND terminal and the VDD terminal, and the TCLK terminal is connected to the GND terminal.

As compared to the case of the IC-1A, the connection structure of the IC-1B lacks the capacitors C1, C3, the inductor L, the schottky diode D3, D4, the Zener diode ZD1, but as described above, this is because they are not needed to be provided redundantly since the IC-1B is connected in parallel to the IC-1A. Meanwhile, since the capacitor C2, the resistors R2 and the capacitors C4, C5 have a purpose of suppressing noise on the low frequency side mainly, they are also provided in the IC-1B because there may be influence thereof even when being connected in parallel if a distance from the IC-1B is too far.

The LIN1 terminal is connected to a collector on a photo transistor side of a photo coupler PH2 of a higher-order side interface H-INT via a resistor R3. A transistor Tr2 and resistors R4, R5 for allowing stable operation of the transistor Tr2 are connected to a light-emitting diode side of the photo coupler PH2. The other side of the resistor R5 is connected to the battery controller 20 via an FF reception line (FFON) which constitutes the communication harness 50 and is for starting the series of B-group ICs. Between the GND terminal and the LIN1 terminal, a Zener diode ZD2 is inserted. The LIN12 terminal is connected directly to the LIN2 terminal, and the LIN2 terminal is connected (via a resistor R3) to the LIN1 terminal of the IC-2B as a B-group IC on the lower-order side. A purpose thereof is to reduce noise flowing through the transmission/reception loop as explained above.

The LIN1 is an input terminal for transmitting a signal (control information), and the LIN2 is an output terminal for transmitting a signal (control information). The internal structure of the IC will be described later using FIG. 11, but as shown in FIG. 11, the LIN12 terminal is connected to the terminal Vcc via a resistor R. As shown in FIG. 10, from the LIN12 terminal of the IC-1A, a voltage is supplied to the collector on the photo transistor side of the photo coupler PH1 of the higher-order side interface H-INT. Specifically, a voltage supplied to the Vcc terminal in FIG. 11 supplies a voltage to the collector on the photo transistor side of the photo coupler PH1 from the LIN12 terminal via the resistor R. A voltage is applied to the collector on the photo transistor side of the photo coupler PH1 via the LIN1 terminal from a LIN reception circuit 106 of FIG. 11, but a voltage from the LIN12 terminal is supplied further. The photo transistor of the photo coupler PH1 performs conduction and a blocking operation based on an optical input signal made by a signal transmitted thereto. Accordingly, an in-coming signal is transmitted to the LIN1 terminal of the IC. For example, when the photo transistor of the photo coupler PH1 turns to a blocked state based on an in-coming signal, the voltage of the LIN12 terminal is applied to the LIN1 terminal via the resistor R3. On the other hand, when the photo transistor of the photo coupler PH1 turns to a conduction state based on an in-coming signal, the collector potential of the photo transistor becomes a low potential, which is substantially the potential of the terminal GND of the IC, and lowers the voltage of the LIN1 terminal. When the photo transistor is in a conduction state, a current supplied from the LIN12 terminal as a collector current and a current supplied from the LIN1 terminal flow through the photo transistor. The potential of the LIN1 terminal rises by a voltage that correspond to a voltage drop of the resistor R3, but it does not become an obstruction particularly in operation.

The photo coupler PH1 consumes large power since it operates at relatively high speed, and has a structure in which a current can be supplied also from the LIN12 terminal of the IC-12A. Since opponents of connection consumes small power, the IC-1B to the IC-12B other than the IC-1A do not necessarily need the function of the LIN12 terminal, but with this terminal, power consumption of the ICs are uniformized and the power consumption of the cells are uniformized. In this embodiment, since transmission of information is performed via a loop that goes through all the ICs, there is an effect that power consumption necessary for transmission/reception via the transmission/reception loop is uniformized for each of the ICs. Also, as described above, the Vcc terminal of each IC is connected to a positive terminal of the highest order cell in each cell group and meanwhile the GND terminal of each IC is connected to a positive terminal of the lowest order cell in each cell group so that consumed power of each IC is supplied from cells of the entire cell group corresponding to this IC. Thus, there is an effect that consumed power used for transmission/reception is shared in a direction to be uniformized for all the cells.

The FFI terminal and the FFO terminal are terminals for performing communication in a daisy chain about overcharging between the battery controller 20 and the B-group ICs. The FFI terminal is connected to a collector on a photo transistor side of a photo coupler PH3 of the higher-order side interface H-INT via a resistor R3. A transistor Tr3 and resistors R4, R5 for allowing stable operation of the transistor Tr3 are connected to a light-emitting diode side of the photo coupler PH3. The other side of the resistor R5 is connected to the battery controller 20 via an FF input line (FFIN) which constitutes the communication harness 50 and is for performing overcharging detection conduction test of the B-group IC. Between the GND terminal and the FFI terminal, a Zener diode ZD2 is inserted. On the other hand, the FFO terminal is connected (via a resistor R3) to the FFI terminal of the IC-2B as a B-group IC on a lower order side.

Connection structures of the IC-2A, IC-2B are principally the same as those of the IC-1A, IC-1B. Differences in the connection structures are, in the IC-2A, that the Vcc terminal is coupled directly to the GND terminal of the IC-1A as a higher-order side A-group IC and that the LIN1 terminal is connected via a resistor R3 to the LIN2 terminal of the IC-1A, and in the IC-2B, that the LIN1 terminal is connected via a resistor R3 to the LIN2 terminal of the IC-1B as a higher-order B-group IC and that the FFI terminal is connected via a resistor R3 to the FFO terminal of the IC-1B. Such connection structures are the same also for the IC-3A, IC-3B, . . . , IC-11A, IC-11B. Note that the LIN12 terminal of the highest-order IC-1A is pulled up by the Vcc terminal in the IC (refer to FIG. 11), and used as a pull-up resistor by connecting the LIN12 terminal of the IC-1A to the photo coupler PH1.

The IC-12A, IC-12B located at the lowest order are principally the same as the above-described connection structures. Differences in the connection structures are, in the IC-12A, that the LIN2 terminal is connected to an anode on a light-emitting diode side of a photo coupler PH4 of the lower-order side interface L-INT for performing communication with the battery controller 20 in an insulated state, and in the IC-12B that the FFO terminal is connected to an anode on a light-emitting diode side of a photo coupler PH5 of the lower-order side interface L-INT. A transistor Tr4 and a resistor R6 for allowing stable operation of the transistor Tr4 are connected to the photo transistor side of the photo coupler PH4. The other end side of the resistor R6 is connected to the battery controller via a LIN transmission line (TX) which constitutes the communication harness 50. On the other hand, a transistor Tr5 and a resistor R6 are connected to the photo transistor side of the photo coupler PH5. The other end side of the resistor R6 is connected to the battery controller 20 via an FF output line (FFOUT) which constitutes the communication harness 50. Note that in a circuit similar to this embodiment, generally the voltage applied to the LIN1 terminal is higher than an operating voltage of the IC.

The photo transistor of the photo coupler PH1 of the higher-order side interface H-INT is a circuit capable of transmitting/receiving a signal at high speed and consumes larger power than the other photo couplers PH2 and PH3. Also, it consumes larger power than other ICs, and accordingly the power can be supplied thereto also from the LIN terminal 12 in addition to the LIN1 terminal. In circuits of the IC-1B to IC-12B, opponents of transmission of the LIN2 terminal consume small power and hence do not necessarily need the LIN12 terminal. However, since it is better to uniformize power consumption of each cell as much as possible, the power consumption of the ICs is uniformized by connecting the LIN12 terminal to the LIN2 terminal, and thereby the power consumption of the cells connected in parallel is uniformized.

Also, to make the noise suppressing effects the same by inserting an inductor in the GND line of all the ICs, an inductor L' (22 µH in this example) is inserted between the negative electrode of the cell B48 of the lowest order and the ground (GND). Note that leads of the aforementioned temperature sensors TH1 to TH4 are relayed by the substrate of the C/C 80 (refer to TH1 to TH4 of FIG. 10) and connected to the battery controller 20 by the communication harness 50.

Next, capacity adjustment of cells by the A-group ICs will be explained briefly. For example, when capacity (voltage)

adjustment of the cell B2 is attempted, a switch element SW2 such as FET provided between the BR2 terminal and the CV3 terminal in the IC-1A is turned on for a predetermined time while discharging (also refer to FIG. 11) so as to allow a current to flow across a drain terminal and a source terminal of the switch element SW2 via the capacity adjusting resistor R1. This current is heat-consumed by the capacity adjusting resistor R1, and thus the capacity adjustment of the cell B2 can be performed.

Figure 18:
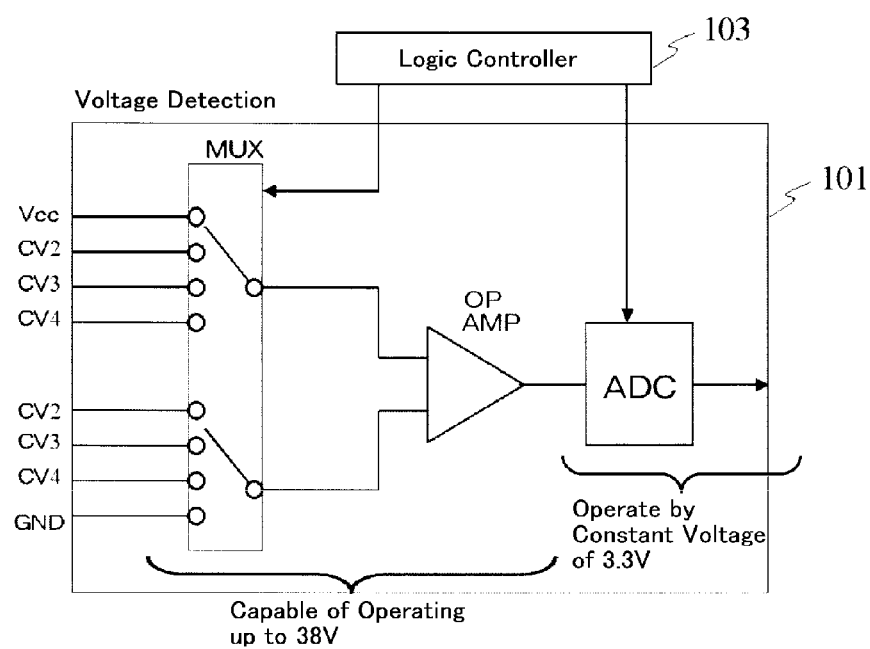
FIG. 18 is a block circuit diagram of a voltage detecting circuit in an IC.

The basic structure of each IC is shown in FIG. 11. Also, a basic structure of a voltage detecting circuit 101 is shown in FIG. 18. Each IC is constituted having a voltage detecting circuit 101 constituted having a multiplexer for selecting a cell as a voltage detection target in a group constituted of cells and an AD converter for converting an analog voltage of a cell selected by the multiplexer into a digital voltage, a reference power supply circuit 104 generating a reference power supply with high precision, a logic circuit 103 having a logical operation function, a LIN reception circuit 106 with an input side connected to the LIN1 terminal and an output side connected to the logic circuit 103, a LIN transmission circuit 107 with an input side connected to the logic circuit 103 and an output side connected to the LIN2 terminal, an FF input circuit 108 with an input side connected to the FFI terminal and an output side connected to the logic circuit 103, an FF output circuit 109 with an input side connected to the logic circuit 103 and an output side connected to the FFO terminal, a switch control circuit 102 which is connected to the logic circuit 103 and controls conduction and a blocking operation of switch elements SW1 to SW4 so that they are connected in parallel to cells to which the capacity adjusting resistor R1 correspond, and so on.

The logic circuit 103 performs control of receiving information from the higher order side and transmitting information to the lower order side and further control of detecting terminal voltages of the cells constituting the corresponding group periodically by the voltage detecting circuit, retaining values thereof, and transmitting the detected terminal voltages of the cells based on an instruction of a received signal.

As shown in FIG. 11, each IC has switch elements which are the same in number as the cells constituting the corresponding group. In this embodiment, each IC has four switch elements SW1 to SW4. The switch element SW1 is connected in parallel between terminals of the cell B1 via a resistor R1 shown in FIG. 10. Also, the switch element SW2 is connected in parallel between terminals of the cell B2 via a resistor R1 shown in FIG. 10. Similarly, the switch element SW3 is connected in parallel between terminals of the cell B3 via a resistor R1, and the switch element SW4 is connected in parallel between terminals of the cell B4 via a resistor R1. With this circuit structure, a cell having a larger charge amount than a mean charge amount (mean capacity) of the cells can be uniformized in charge amounts by discharging charged power by the aforementioned parallel circuit. Conduction and a blocking operation of a discharge circuit by the aforementioned switch elements are controlled by the switch control circuit 102. Since the switch elements SW1 to SW4 for uniformizing states of charge of cells are thus incorporated in each IC, the entire system can be simplified significantly, and workability in manufacturing steps of the battery module improves. Also, there is an effect that reliability of the battery module also improves. Further, since the resistors R1 for consuming power (refer to FIG. 10) is provided outside the IC, heating of the IC can be reduced and enlargement of the IC can be reduced.

As shown in FIG. 18, the logic controller 103 controls a multiplexer MUX and an analog-digital converting circuit ADC periodically and detects terminal voltages of the cells in the group corresponding to the IC in a predetermined order. When the multiplexer MUX selects the Vcc terminal and the CV2 terminal, the terminal voltage of the highest order cell among the cells constituting the group is inputted to an operational amplifier OPAMP. The terminal voltage inputted to the operational amplifier OPAMP is reduced by a predetermined ratio and matched in reference potential, and converted into a digital value by the analog-digital converting circuit ADC. The digitally converted terminal voltage is stored temporarily in a circuit (refer to a shift register) of FIG. 11 and transmitted based on a transmission instruction.

In FIG. 18, when the multiplexer MUX selects the CV3 terminal, the terminal voltage of the second highest-order cell among the cells constituting the group is inputted to the operational amplifier OPAMP. Thus, by the multiplexer MUX, terminal voltages of the cells in the group are inputted to the operational amplifier OPAMP in order and reduced by a predetermined ratio and matched in reference potential, and converted into a digital value. This control is repeated thereafter, and terminal voltages of the cells in the group corresponding to the IC are detected in a predetermined order. In FIG. 18, the multiplexer MUX and the operational amplifier OPAMP and the analog-digital converting circuit ADC operate with the potential of the terminal GND being the reference. The potential of the terminal GND changes by potentials of the cells, but since the multiplexer MUX and the operational amplifier OPAMP and the analog-digital converting circuit ADC change by the same reference potential, these circuits operate precisely. Since the largest voltage Vcc in the corresponding group is inputted to the multiplexer MUX and the operational amplifier OPAMP, they are circuits capable of corresponding to a voltage higher than Vcc, for example up to 38 V. On the other hand, the analog-digital converter ADC is made to operate by a constant voltage 3.3 V generated by the reference power supply circuit 104 described in FIG. 11. Thus, terminal voltages of the cells can be measured accurately. In FIG. 18, an inputted potential of a terminal voltage of each cell is converted in the operational amplifier OPAMP, and a change width of a terminal voltage of each cell as a target of measurement is matched to a common range, withstanding voltage of a circuit of the analog-digital converting circuit ADC can be reduced. Also, as described above, there is an effect that the accuracy of the analog-digital converting operation can be increased.

In FIG. 11, in each IC, a protection circuit constituted of diodes and Zener diodes for protecting each IC from noise and surge voltage is provided. These protection circuits include a diode D5 with an anode side connected to the CV3 terminal and a cathode side connected to the Vcc terminal, a Zener diode ZD6 with an anode side connected to the GND terminal and a cathode side connected to the LIN1 terminal, a diode D7 with an anode side connected to the GND terminal and a cathode side connected to the LIN2 terminal, a Zener diode ZD8 with an anode side connected to the GND terminal and a cathode side connected to the FFI terminal, and a diode D9 with an anode side connected to the GND terminal and a cathode side connected to the FFO terminal.

<Noise Measures of the C/C 80>

Here, noise and surge measures of the C/C 80 of this embodiment will be explained. The following table 1 shows conditions of measures against noise generated by an opponent of connection of the battery module such as an inverter.

TABLE 1

| No. | Contents | Purpose |
|---|---|---|
| 1 | Inserting L | To suppress LIN1 input noise |
| 2 | Adding ZD1 between Vcc and GND | To suppress Vcc noise |
| 3 | Adding ZD2 between LIN1 and GND | Surge protection |
| 4 | Inserting R3 in LIN1, FFI (input side) | To improve noise resistance (output side protection) |
| 5 | Adding D3 between CV3 and Vcc | Surge protection |
| 6 | Adding D4 between CV3 and GND | To suppress dispersion in dark current, surge protection |
| 7 | Adding C3 between Vcc and GND | To suppress Vcc noise |
| 8 | Adding C2 between voltage detecting terminals | To suppress low frequency side noise |
| 9 | Increasing area of a ground plane | To realize low impedance |

1. Inserting an Inductor L

Figure 12:
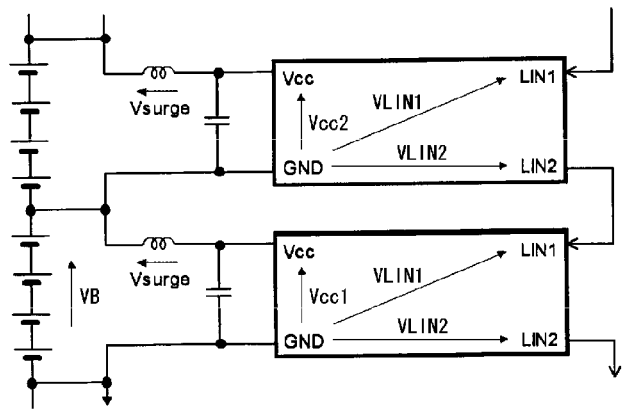
FIGS. 12 (A) to 12 (D) are explanatory diagrams of a cell controller in which a GND terminal of a higher-order IC and a Vcc terminal of a lower-order IC are connected via an inductor, and a LIN2 terminal of the higher-order IC and a LIN1 terminal of the lower-order IC are coupled directly, FIG. 12 (A) showing a circuit diagram, FIG. 12 (B) showing a voltage waveform of noise of 60 Vpp, FIG. 12 (C) showing a voltage waveform of noise superposed between the GND terminal and the LIN1 terminal, and FIG. 12 (D) showing a voltage waveform of noise superposed between the GND terminal and the Vcc terminal.
Figure 12:
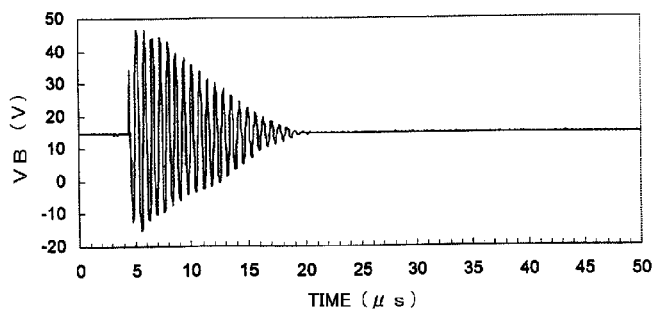
Figure 12:
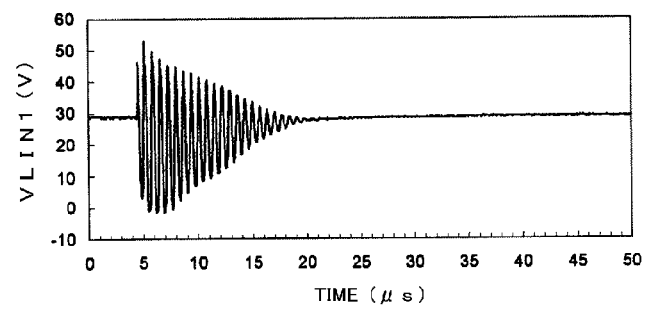
Figure 12:
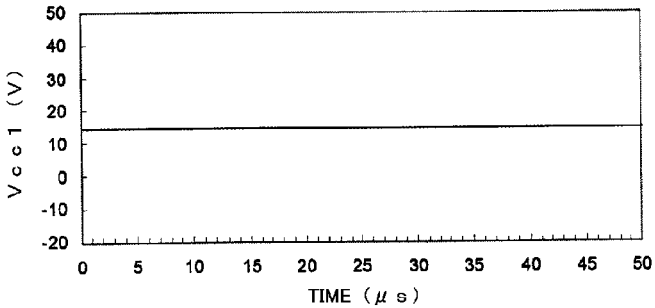

For example, focusing attention on A-group ICs, to suppress noise, as shown in FIG. 12(A), the Vcc terminal of a lower-order IC (for example, IC-7A) is connected viaan inductor to a highest-order terminal of cells constituting a group, namely the GND terminal of a higher-order IC (for example, IC-6A). As shown in FIG. 12(B), noise of 60 Vpp (peak-to-peak volt) is applied to a group of cells corresponding to the lower-order IC. By inserting the inductor between the Vcc terminal of the IC and the terminals of the cells, the noise is not superposed on the LIN2 terminal as shown in FIG. 12 (D) despite the application of the noise. In other words, there is an effect of suppressing noise. However, as shown in FIG. 12 (C), the noise is superposed on the LIN1 terminal, and it is desirable that further improvement is made regarding suppression of noise in this part.

Figure 13:
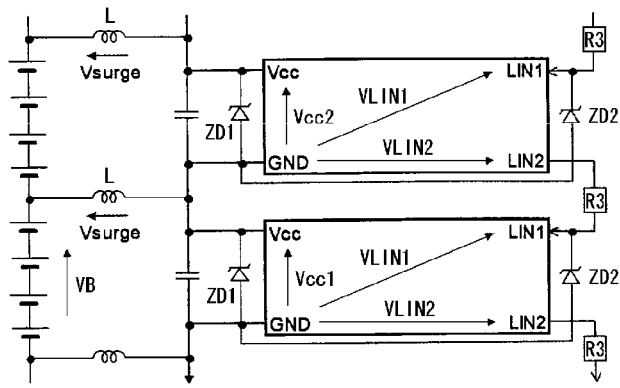
FIGS. 13 (A) to 13 (D) are explanatory diagrams of a cell controller of an embodiment, FIG. 13 (A) showing a circuit diagram, FIG. 13 (B) showing a voltage waveform of noise of 60 Vpp, FIG. 13 (C) showing a voltage waveform of noise superposed between the GND terminal and the LIN1 terminal, and FIG. 13 (D) showing a voltage waveform of noise superposed between the GND terminal and the Vcc terminal.
Figure 13:
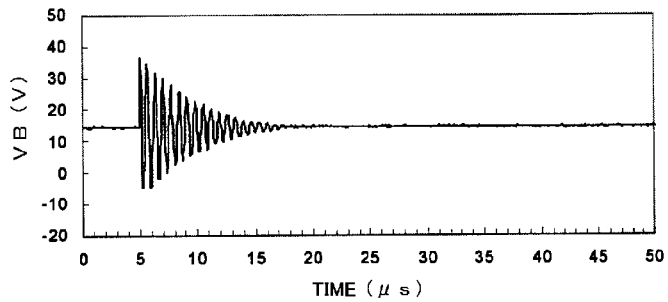
Figure 13:
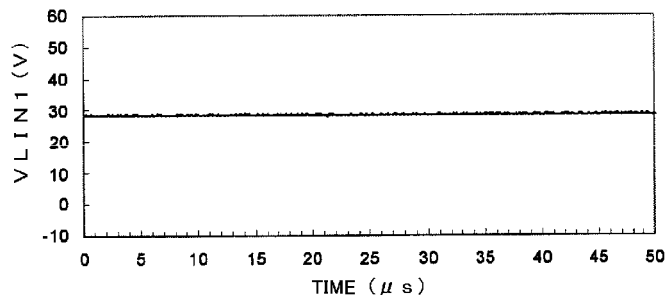
Figure 13:
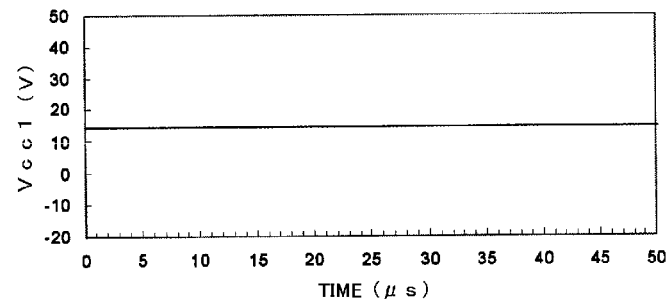

As shown in FIG. 13(A), in the C/C 80 of this embodiment, the Vcc terminal of a lower-order IC (for example, IC-7A) is connected directly to the GND terminal of a higher-order IC (for example, IC-6A). Therefore, with respect to the connection structure of FIG. 12 (A), the inserting position of the inductor L is changed. As shown in FIG. 13 (B), even when applying noise of 60 Vpp to a group constituted of cells corresponding to the lower-order IC, the noise is barely superposed on the LIN1 terminal as shown in FIG. 13 (C). Also, the noise is not superposed on the LIN2 terminal (refer to FIG. 13 (D)). Therefore, a more excellent noise suppressing effect than in FIGS. 12 (A) to 12 (D) can be obtained.

When 48 cells are connected in series, there may be noise due to a voltage variation in the battery unit or noise may be superposed on the battery unit from the outside. It is conceivable that inserting an inductor as a noise measure is most effective. Also in the connection structure of FIG. 12 (A), reliability against noise or surge can be increased. In this embodiment, the structure of FIG. 13 (A) is adopted and an inductor L' is further inserted between a negative electrode of the cell B48 and the ground (GND) so as to make noise suppressing effects of all the ICs the same, and thus noise resistance of the C/C 80 is improved. Also, in the above description the A-group ICs are explained, but the same applies to the B-group ICs connected in parallel thereto.

2. Adding a Zener Diode ZD1 Between the Vcc Terminal and the GND Terminal

As shown in FIG. 13 (A), a Zener diode ZD1 for protecting the Vcc terminal from noise is inserted between the Vcc terminal and the GND terminal. Thus, the C/C 80 is further improved in noise resistance.

3. Adding a Zener Diode ZD2 Between the LIN1 Terminal and the GND Terminal

As shown in FIG. 13 (A), between the LIN1 terminal and the GND terminal, a Zener diode ZD2 for protecting the LIN1 terminal from a surge voltage is inserted. Thus, the C/C 80 of this embodiment is further improved in surge resistance.

4. Inserting a Resistor R3 in the LIN1 Terminal (Inserting a Resistor R3 in the FFI Terminal)

Figure 14:
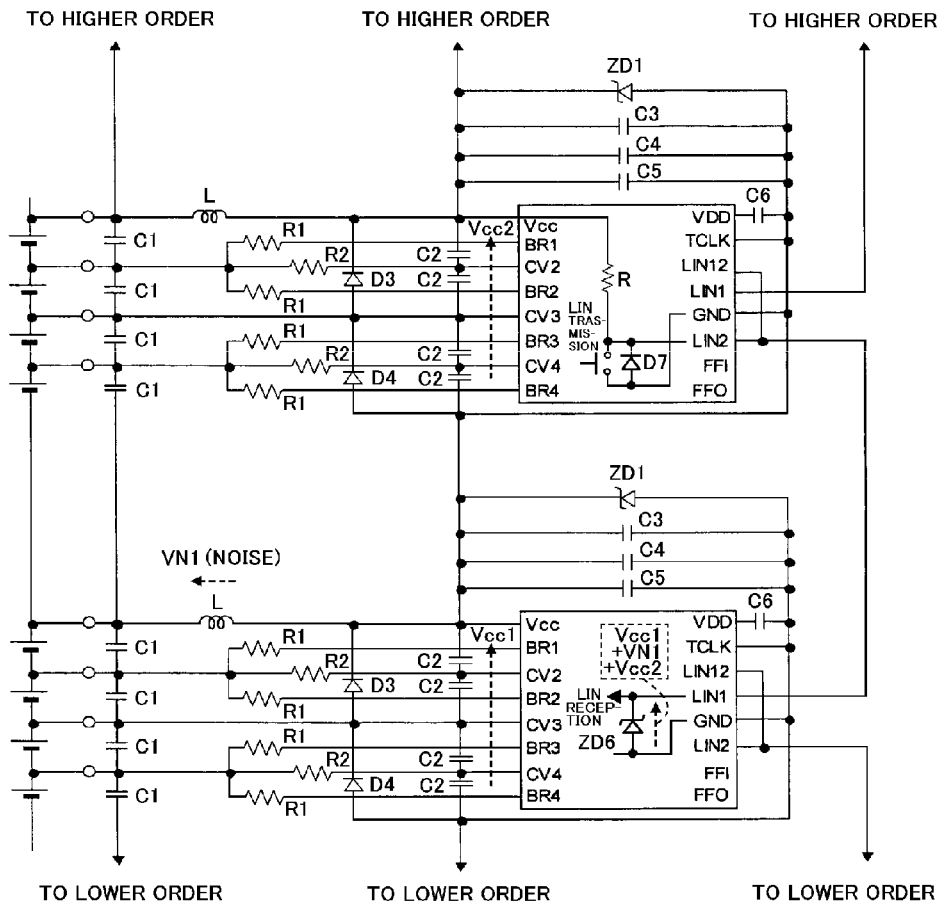
FIG. 14 is an explanatory diagram of a voltage applied to the LIN2 terminal in the cell controller in which the LIN2 terminal of the higher-order IC and the LIN1 terminal of the lower-order IC are coupled directly.

As shown in FIG. 11, to protect the LIN terminal from a surge voltage when the battery is connected or operated, in the IC the diode D7 is inserted between the LIN2 terminal and the GND terminal, and the Zener diode ZD6 is inserted between the LIN1 terminal and the GND terminal. Also, between the Vcc terminal and the LIN2 terminal, a resistor R of approximately 5 kΩ is inserted. However, as shown in FIG. 14, when a large surge voltage VN1 enters, the LIN1 terminal is restricted in voltage by the Zener diode ZD6 and becomes a negative voltage. On the other hand, when the LIN1 terminal changes to have a negative voltage, current restriction is not applied in the LIN2 terminal of a higher-order IC coupled directly to the LIN1 terminal, and hence it is possible that a large current flows to the diode D7 and leads to destruction, which is preferred to be suppressed.

In the C/C 80, to prevent IC destruction, as shown in FIG. 13 (A), the resistor R3 is inserted in the LIN1 terminal of the lower-order IC. It is preferable that a resistance value of the resistor R3 is taken large in a range that it does not affect communication, and is set to 470Ω that is a tolerated range of the IC maker. Note that although the A-group ICs are explained above, a diode D9 is inserted between the FFO terminal and the GND terminal and a Zener diode ZD8 is inserted between the FFI terminal and the GND terminal as shown in FIG. 11, and there is a fear that a similar problem occurs also in the B-group ICs, which is preferred to be suppressed. Therefore, a resistor R3 is inserted also in the FFI terminal of a lower-order IC.

5. Adding a Schottky Diode D3 Between the CV3 Terminal and the Vcc Terminal

Figure 15:
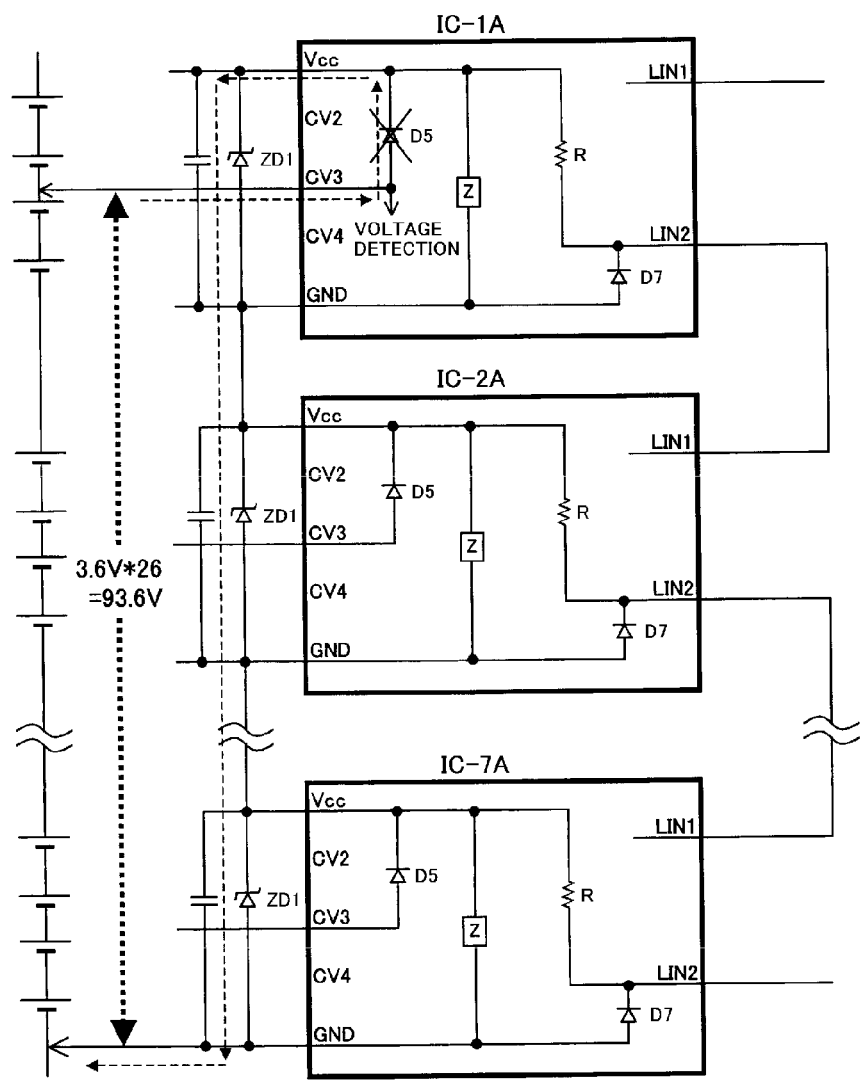
FIG. 15 is an explanatory diagram of a voltage applied to a CV3 terminal of an IC constituting a cell controller during assembly.

As shown in FIG. 10, a resistor R2 constituting an RC filter is inserted in the CV2 terminal and the CV4 terminal, but the CV3 terminal is coupled directly to the negative electrode of the cell B2. As shown in FIG. 15, when the CV3 terminal of a higher-order IC (for example, IC-1A) and the GND terminal of a lower-order IC (for example, IC-7A) come in contact first at the time of connecting the battery, a high voltage is applied between the CV3 terminal and the Vcc terminal of the higher-order IC, which can destroy the diode D5 inserted between the CV3 terminal and the Vcc terminal in the IC. In this embodiment, to prevent this, the schottky diode D3 (with a rated current 1A in this example) having a small voltage drop is inserted between the CV3 terminal and the Vcc terminal.

6. Adding a Schottky Diode D4 Between the CV3 Terminal and the GND Terminal

As shown in FIG. 10, a schottky diode D4 (with a rated current 1A in this example) is inserted between the CV3 terminal and the GND terminal. In reverse to the above item 5, when the Vcc terminal of a higher-order IC and the CV3 terminal of a lower-order IC come in contact first, a high voltage is applied to a diode D10 (refer to FIG. 11), which can destroy the diode D10. To prevent this and also to suppress dispersion in dark current, a schottky diode D4 is inserted. The present inventors inserted switches in all the voltage detecting lines 58 in the C/C circuit shown in FIG. 10 and conducted a connection test of the cells and the C/C controller by turning on the switches from the higher-order side, from the lower-order side, and in an arbitrary order, and confirmed that the ICs (diodes D5, D10 therein) are not destroyed in any case. Specifically, generation of surge cannot be avoided at the time of connecting the battery, but the present inventors confirmed that, by providing the schottky diodes D3, D4 outside the ICs, most of the current flows to the schottky diodes D3, D4 side and a current that is only 1/20 of or lower than the current flowing through the schottky diodes D3, D4 flows through the diode D5 in the ICs.

7. Adding a Capacitor C3 Between the Vcc Terminal and the GND Terminal

In the C/C 80, the capacitor C3 with a large capacity (1 μF in this example) is inserted between the Vcc terminal and the GND terminal. Accordingly, noise on the low frequency side entering the Vcc terminal can be suppressed further.

8. Adding Capacitors C2 Between the Voltage Detecting Terminals

Also, in the C/C 80, besides the capacitors C1 which are connected in parallel to the respective cells and suppress noise on the high frequency side, capacitors C2 having a larger capacity than the capacitors C1 are inserted between the Vcc terminal and the CV2 terminal, between the CV2 terminal and the CV3 terminal, between the CV3 terminal and the CV4 terminal, and between the CV4 terminal and the GND terminal, respectively. Accordingly, noise on the low frequency side (kHz order) can be suppressed for each IC when operating.

9. Increasing the Area of a Ground Plane

As shown in FIG. 10 and FIG. 13(A), in the C/C 80, the GND terminal of a higher-order IC and the Vcc terminal of a lower-order IC can be coupled directly. Accordingly, in a C/C mounting substrate, every two circuit blocks (for example, IC-1A and IC-1B, IC-2A and IC-2B) can be coupled directly to form a large ground plane (so-called solid pattern) (refer to chain lines in FIG. 9). Conventionally, the ground plane could be formed only in unit of one circuit block (for example, IC-1A and IC-1B). Accordingly, in the C/C 80, by enlarging the area of the ground plane, impedance can be lowered and noise resistance can be improved.

<C/C Mounting Substrate>

As shown in FIG. 10, the C/C 80 has a constraint that it is constituted of, besides the 24 ICs, a large number of chip elements attached externally to these ICs, and a constraint that the signal output terminals (LIN2 terminal, FFO terminal) and the signal input terminals (LIN1 terminal, FFI terminal) of the respective ICs are connected in a daisy chain. In view of these constraints, on the substrate of the C/C 80, as shown in FIG. 9, the 24 ICs IC-1A to IC-12B are positioned and mounted corresponding to connection states of cells as measurement targets. Potentials of cells connected in series vary according to charged/discharged states of the battery, and potentials of cells as measurement targets of the respective ICs change. Accordingly, reference potentials of the ICs change automatically. It is needed to perform sending/receiving of a signal accurately between these changing ICs. Therefore, it is desirable to arrange ICs each including a measurement circuit in a positional relationship related to the relationship of the serial connection of the cells as measurement targets. In this manner, complexity in signal transmission between ICs having different potentials is eliminated. Also, the signal transmission becomes simple, and reliability of sending/receiving signals becomes high. The signal transmission between ICs having different potentials can be influenced in various ways, and hence it is desirable to reduce the possibility of being influenced by external noise or stray capacitance for example. In this embodiment, the aforementioned influences are reduced by arranging the ICs in a related manner to the connection relationship of the cells. Further, since the respective ICs are in a positional relationship such that ones having close reference potentials are arranged closely, wirings for signal transmission become short, and various adverse influences such as the above influences are reduced. Thus, high reliability can be obtained.

In this embodiment, specifically, the ICs are mounted four by four on rectangular longer sides of a rectangular continuous straight line 1-1' defined on the substrate in order from the IC-1A, IC-1B on the highest potential side to the IC-12A, IC-12B on the lowest potential side continuously according to an order of potentials of the groups constituted of the cells. Also, in this embodiment, for mounting the 24 ICs in a most compact manner, distances (lengths) between rectangular shorter sides of the rectangular continuous straight line 1-1' are set to be the same. The ICs are mounted such that ones having close reference potentials are arranged closely.

Also, since the capacity adjusting resistors R1 generate heat during capacity adjustment in the capacity adjusting circuits each constituted of a capacity adjusting resistor R1 and switch elements SW1 to SW4 (refer to FIG. 11) in the A-group ICs, the 48 capacity adjusting resistors R1 are mounted by dividing in two and grouped in regions (dashed-line regions in FIG. 9) in the vicinity of the connectors 48, 49 separated from the rectangular continuous straight line 1-1'. On the other hands, the photo couplers PH1 to PH3, the transistors Tr1 to Tr3, the resistors R4, R5, and the photo couplers PH4, PH5, the transistors Tr4, Tr5, the resistors R6 constituting the higher-order side interface H-INT and the lower-order side interface L-INT respectively are arranged, by dividing into the higher-order side and the lower-order side, close to the connector from which the communication harness 50 is led out in upper regions (chain double-dashed line regions in FIG. 9) of the substrate. Note that other chip elements are mounted in the vicinity of the corresponding ICs. With such an arrangement, both the reduction in size and the improvement of reliability are possible <<Power Supply System>>
<High Voltage Circuit of the Power Supply System>

FIG. 17 shows a basic structure of a driving system of a vehicle and also shows a power supply system in the driving system. As shown in FIG. 17, the positive electrode high voltage cable 81 of one (lower potential side) of the vertically stacked battery modules 9 is connected to a fuse side of an SD (service disconnect) switch 6 for maintenance and inspection in which a switch and a fuse are connected in series, and the negative electrode high voltage cable 82 of the other one (high voltage side) of the vertically stacked battery modules 9 is connected to a switch side of the SD switch 6. In other words, the two battery modules 9 are connected in series via the SD switch 6, and constitute a high voltage battery (battery with a power supply system in which two battery modules 9 are connected in series) having a nominal voltage of 340 V and a capacity of 5.5 Ah. Note that for the fuse of the SD switch 6, one having a rated current of approximately 125 A can be used for example. With such a structure, high safety can be maintained.

Also, three high voltage relays, which are a negative electrode side main relay $RL_N$ inserted between the negative electrode of the high voltage battery and an inverter device 120, a positive electrode side main relay $RL_P$ inserted between the positive electrode of the high voltage battery and the inverter device 120, and a precharge relay $RL_{PRE}$ connected in parallel with the positive electrode side main relay $RL_P$ via a resistor $R_{PRE}$, and a current sensor $S_I$ such as a hall element inserted between the positive electrode side main relay $RL_P$ and the inverter device 120 are included in a junction box. Note that an output line of the current sensor $S_I$ is connected to the battery controller 20. For the positive electrode side main relay $RL_P$ and the negative electrode side main relay $RL_N$, one having a rated current of approximately 80 A can be used for example, and for the precharge relay $RL_{PRE}$, one having a rated current of approximately 10 A can be used for example. Also, for the resistor $R_{PRE}$, one having a rated current of approximately 60 W and a resistance value of approximately 50Ω can be used for example, and for the current sensor $S_I$, one having a rated current of approximately ±200 A can be used for example.

Therefore, the above-described negative electrode high voltage cable 82 of the one battery module 9 and the positive electrode high voltage cable 81 of the other battery module 9 (the negative electrode and the positive electrode of the high voltage battery) are connected to the inverter device 120 which drives a motor 130 of the hybrid vehicle via the high voltage relays and the output plugs. With such a structure, high safety can be maintained.

The inverter device 120 has a power module 126 constituting an inverter which converts direct current power supplied from the power supply of the high voltage battery of 340 V into three-phase alternate current power for driving the motor 130, an MCU 122, a driver circuit 124 for driving the power module 126, a smoothing capacitor (an electrolytic capacitor or a film capacitor may be used) 128 having a large capacity of approximately 2000 μF.

When driving the motor 130, the MCU 112 turns the negative electrode side main relay $RL_N$ from an off state to an on state according to an instruction from the higher controller 110, and thereafter, the MCU 112 turns the positive electrode side main relay $RL_P$ from an off state to an on state, thereby receiving power from the high voltage battery of the power supply system 1. Note that the inverter device 120 makes the motor 130 operate as a generator via a regulator when the hybrid vehicle is braking, namely, performs regenerative braking control, and regenerates the power generated by the generator operation for the high voltage battery so as to charge the high voltage battery. Also, when the state of charge of the battery module 9 decreases lower than a reference state, the inverter motor controller 120 operates the motor 130 as a generator, and the three-phase alternate current generated in the motor 130 is converted into a direct current by an inverter constituted of the power module 126, supplied to the battery modules 9 as the high voltage battery and charged therein.

As described above, the inverter is constituted of the power module 126, and the inverter performs power conversion between direct current power and alternate current power. According to an instruction from the higher controller 110, the driver circuit 124 is controlled and a switching operation of the power module 126 is controlled so as to generate a revolving magnetic field in an advancing direction with respect to rotation of a rotor of the motor 130, when the motor 130 is operated as a motor. In this case, direct current power is supplied to the power module 126 from the battery module 9. On the other hand, the driver circuit 124 is controlled and a switching operation of the power module 126 is controlled so as to generate a revolving magnetic field in a delaying direction with respect to the rotation of the rotor of the motor 130. In this case, power is supplied to the power module 126 from the motor 130, and direct current power of the power module 126 is supplied to the battery module 9. As a result, the motor 130 operates as a generator.

The power module 126 of the inverter device 120 performs conduction and a blocking operation at high speed to perform power conversion between direct current power and alternate current power. At this time, since for example a large current is blocked at high speed, a large voltage variation occurs by inductance which the direct current circuit has. To suppress this voltage variation, the smoothing capacitor 128 with a large capacity is provided in the direct current circuit. Heat generation by the power module 126 is a big problem in the inverter device 120 for mounting on a vehicle, and to suppress this heat generation, the operation speed of conduction and blocking in the power module 126 needs to be increased. By increasing this operation speed, jumping up of a voltage by the aforementioned inductance increases, and larger noise occurs. Therefore, the capacity of the smoothing capacitor 128 tends to be larger.

In an operation start state of the inverter, the charge in the smoothing capacitor is substantially zero, and a large initial current flows in via the relays. Since an initial flow-in current from the high voltage battery to the smoothing capacitor 128 becomes large, the negative electrode side main relay $RL_N$ and the positive electrode side main relay $RL_P$ may fuse and get damaged. Accordingly, in the initial state, after turning the negative electrode side main relay $RL_N$ from an off state to an on state, the MCU 122 leaves the positive electrode side main relay $RL_P$ in an off state but turns the precharge relay $RL_{PRE}$ from an off state to an on state to restrict the current via the resistor $R_{PRE}$, and meanwhile charges the above-described smoothing capacitor in this state. After this smoothing capacitor is charged to a predetermined voltage, the initial state is released. The negative electrode side main relay $RL_N$ and the positive electrode side main relay $RL_P$ are turned to on states, to thereby supply direct current power to the power module from the power supply system 1 as described above, without using the precharge relay $RL_{PRE}$ and the resistor $R_{PRE}$. By performing such control, the relay circuits are protected and safety of the inverter device 120 can be maintained.

Since reduction of the inductance on the direct current side circuit of the inverter device 120 leads to suppressing of noise voltage, the smoothing capacitor 128 is arranged close to a direct current side terminal of the power module 126. Also, the smoothing capacitor itself is made to be capable of reducing the inductance. When the initial charge current of the capacitor is supplied in such a structure, there is a fear that high heat is generated to cause damage. This damage can be reduced by the precharge relay $RL_{PRE}$ and the resistor $R_{PRE}$. Control of the inverter device 120 is performed by the MCU 122, but as described above, control for initially charging the capacitor 128 is also performed by the MCU 122.

As the smoothing capacitor, an electrolytic capacitor or a film capacitor is used. In a capacitor, performance decreases at a low temperature. Particularly, the function of the electrolytic capacitor decreases, and an elimination effect of noise thereof decreases. Noise that cannot be eliminated by the capacitor 128 is applied to the power module, which may cause malfunctioning in the circuit of FIG. 10 as well as damaging to the IC circuit. In the explanation above and the explanation below regarding measures against noise, large effects are exhibited for measures against noise generated by the inverter device 120.

To the connection line between the negative electrode of the high voltage battery of the power supply system 1 and the negative electrode side main relay $RL_N$, and to the connection line between the positive electrode of the high voltage battery and the positive electrode side main relay $RL_P$, capacitors $C_N$, $C_P$ are inserted between the negative and positive electrodes and a case ground (the same potential as the vehicle body of a vehicle) respectively. These capacitors are for removing noise generated by the inverter device 120 to prevent malfunctioning in the low voltage circuit as well as destruction of the ICs constituting the C/C 80 due to a surge voltage. The inverter device 120 has a noise eliminating filter, but these capacitors are inserted for further increasing the effect of preventing malfunctioning in the battery controller 20 and the C/C 80 and for further increasing reliability of the power supply system 1 against noise. Note that in FIG. 17, the high voltage circuit of the power supply system 1 is shown by bold lines. For these lines, straight angle copper wires having a large cross section are used.

<Low Voltage Circuit of the Power Supply System>

As elements to constitute the low voltage circuit, the power supply system 1 has the battery controller 20, the DC/DC converter included in the converter box 21 and supplying 12 V power to the battery controller 20, the blower fan 17, a relay 94 integrated with the blower fan 17 as a unit for operating the blower fan 17, the above-described C/C 80 and the current sensor $S_f$.

The DC/DC converter in the converter box 21 receives power from a 24 V lead battery (not shown) as a power supply of a hybrid vehicle (enables an auxiliary such as a lamp to operate), converts the 24 V voltage to 12 V by a chopper circuit, a smoothing circuit or the like, and supplies a constant voltage of 12 V as operational power supply for the battery controller 20. The DC/DC converter is connected to an on terminal of an ignition switch IGN (refer to the IGN_ON (24 V) line in FIG. 17), starts to operate when the ignition switch IGN is located at an on position to supply power to the battery controller 20 continuously, and stops the power supply to the battery controller 20 when the stop of the power supply is instructed by the battery controller 20 via a shutdown control line. With such a structure, the power supply system with high reliability is realized.

The battery controller 20 has an MPU which performs various types of processing operations as will be described later, a non-volatile EEPROM, an AD converter, a DA converter, a total voltage detecting circuit for detecting the total voltage of the two battery modules 9 connected in series (high voltage battery), and a 5 V power generation circuit which generates 5 V power from 12 V power supplied via the DC/DC converter (refer to FIG. 10).

The total voltage detecting circuit is constituted of an HV+ terminal connected to the positive electrode of the high voltage battery, an alternate current converter connected to an HV-terminal which is connected to the negative electrode of the high voltage battery for converting the total voltage of the high voltage battery to an alternate current, a transformer for insulating the high voltage of the high voltage battery, a dividing resistor which divides the voltage on an output side of the transformer, a direct current converter which converts a voltage divided by the dividing resistor from an alternate current voltage to a direct current voltage, a differential amplifier constituted of an OP amplifier and a resistor for grasping the direct current voltage converted by the direct current converter, and an AD converter which converts an analog voltage outputted from a differential amplifier to a digital voltage, and an output terminal of the AD converter is connected to the MPU. Therefore, the MPU can take in the total voltage of the high voltage battery by a digital value. With such a structure, high precision can be maintained, and the high reliability is maintained.

The battery controller 20 is connected to the on terminal of the ignition switch IGN, and communicates with the higher controller 110 via a communication line 96 included in a main cable (refer to FIG. 17) led out from the power supply system 1. Also, the output line from the current sensor $S_f$ is connected to the MPU via an AD converter, and the MPU can take in the current flowing in the high voltage battery by a digital value. Further, in the battery controller 20, a DA converter and a transistor are arranged, and the MPU turns the relay 94 to an on state via the DA converter and the transistor to operate the blower fan 17. By such operations, highly reliable control is possible.

Also, the battery controller 20 is connected to the C/C 80 via the communication harness 50 and is capable of communicating therewith, but as described above, the communication harness 50 also includes output lines from temperature sensors TH1 to TH4 (refer to FIG. 10). These output lines are converted into digital signals by an AD converter included in the battery controller 20, supplied to the MPU included in the battery controller, and used for various controls.

(Assembly Procedure)

Next, an assembly procedure of the power supply system 1 of this embodiment will be explained in phases in an order of the cell pack 19, the cell pack block 40, the battery module 9, and the power supply system 1.

<Assembly Procedure of the Cell Pack 19>

In FIG. 1 to FIG. 8, an adhesive is applied to curving portions of the holder 11 which contact the cells 10, the cells 10 are arranged so that the polarities thereof are alternated, and pressure is applied thereto to make snap-fitting between the two holders 11 and the cross-shape louver 37 to be a support post between the holders 11 to function. Next, the metal bus bars insert molded in the holder 11 are spot-welded with the respective cells 10. Note that although final fixing of the cells 10 and the two holders 11 depends on the adhesive, there is adopted a structure in which the physical locking force by the snap-fitting holds enough until the adhesive dries out and solidifies. Accordingly, it is possible to proceed to respective steps of welding, inspecting, and assembling after the adhering step without waiting for passing of a drying time period, and thus the time efficiency increases.

Further, it is adopted a structure such that the voltage detecting lines 58 (refer to FIG. 10) are gathered on a connector via the not-shown flexible substrate (one end side of the flexible substrate serves as the connector), and the voltage detecting lines are gathered on the connector just by welding the cells 10 to the metal bus bars. The connector is fixed in advance to one of the holders 11 (holder 11 on the right side in FIG. 7). Accordingly, connection of the voltage detecting lines 58 can be simplified significantly.

<Assembly Procedure of the Cell Pack Block 40>

The cell packs 19 produced as above are arranged in parallel as shown in FIG. 3 so that the two block bases 41 face each other, and fixed by tapping screws 42. As shown in FIG. 5, after the cell packs 19 are fixed on the block bases 41, the block reinforcing plates 51 are arranged on upper portions of the cell packs 19, and fixed by tapping screws 42 similarly to the fixing of the block bases 41. At this time, on a face where the voltage detecting lines 58 are arranged, cable ties 55 for attaching the tie bands 54 are attached by tapping screws 42 at four positions. Thereafter, the detection harness 52 is arranged in the vicinity of the cable ties 55, and fixed by the tie bands 54 to the cell pack block 40. Then, six connectors provided on the other side (opposite side of the harness connector) of the detection harness 52 are inserted (connected) to the connectors of the six cell packs 19 constituting the cell pack block 40 respectively, thereby completing assembly of the cell pack block 40. With such a structure and an assembly method, there is an effect that workability improves.

<Assembly Procedure of the Battery Module 9>

As shown in FIG. 2, the cell pack blocks 40 are arranged on and fixed to the lower cover 45. At this time, in the cell pack blocks 40, hooks made of thick wire are inserted in the circular holes of the block reinforcing plate curving portions 56 of the block reinforcing plates 51 for performing handling such as carrying. In the circular holes 47 formed in both ends of the block bases 41 of the cell pack blocks 40, the stud bolts 78 on the introducing side fixing table 62 and the discharging side fixing table 63 constituting the lower cover 45 are passed through and fastened and fixed by nuts including springs. After the two cell pack blocks 40 are arranged in parallel and fixed, it is confirmed that the block flanges B44 projecting from the block bases 41 of the cell pack blocks 40 oppose each other on the block fixing bases 64, and then the block flanges B44 are fastened by nuts including springs.

When fastening of the cell pack blocks 40 is finished, the C/C box 79 including the C/C 80 is inserted between the cell pack blocks 40 on the discharging side fixing table 63 of the lower cover 45 and the lower cover 45, and the connectors on the tips of the detection harnesses 52 (two are led out as shown in FIG. 2) are engaged with the connectors 48, 49 of the C/C 80 respectively. Thereafter, the C/C box 79 is slid toward and pushed against a side wall of the back face of the lower cover 45, and is fixed by screws from the outside of the battery module 9. There are four fixing points of the C/C box 79, and the C/C box 79 is fixed by lateral fixing from the back face of the lower cover 45 and upper side fixing to welding nut portions provided on the discharging side fixing table 63. To fasten the connectors with each other, the detection harnesses 52 side needs allowances for stroke amounts to insert the connectors, but having such allowances makes the harnesses longer than necessary. The required allowances can be minimized by connecting the connectors with each other at the stage that the C/C box 79 is not fixed and hence free, and then sliding the C/C box 79 to the fixing point.

The block connecting bus bars for electrical connection between the cell pack blocks 40 are fastened by attaching screws, and the positive electrode high voltage cable 81 and the negative electrode high voltage cable 82, which have grommets and are fixed to the lower cover 45 in advance, are connected to the respective cell pack blocks 40 and fastened by screws. Since crimp terminals are connected to ends of these high voltage cables, attaching of them can be performed easily.

After all the electrical connections are finished, the upper cover 46 is placed and the lower cover 45 and the upper cover 46 are fastened by screws. Specifically, the covers are fastened by screws with the stud bolts 88 disposed to stand up on the lower cover flange portions 68 of the lower cover 45 via the circular holes formed in the upper cover flange portions 86 of the upper cover 46. At this time, the block flanges A43 projecting from the block bases 41 are positioned on the lower cover flange portions 68, and fastens the upper cover 46 and the lower cover 45 in the flange portion recesses 87, and also fastens the cell pack blocks 40. Also, the upper cover narrow portions 84 are fastened with the lower cover 45 with screws, and by fastening the upper face of the upper cover 46 and the center poles 66 with screws, assembly of the battery module 9 is completed.

<Assembly Procedure of the Power Supply System 1>

The power supply system 1 is accommodated in an external box constituted of a lower container accommodating two battery modules 9 for example (refer to FIG. 16), and an upper cover which encloses an upper opening of this lower container. First, output plugs and cables are attached to the lower container. At this time, the SD switch 6 is arranged and fixed. Note that as shown in FIG. 17, the cables are constituted of an input line (24 V, GND) to the DC/DC converter, an IGN-ON (24 V) line, the communication line 96, and input lines to the negative electrode side main relay $RL_N$, the positive electrode side main relay $RL_P$, and the precharge relay $RL_{PRE}$.

Next, the battery modules 9 are inserted in the lower container to which the cables are fixed. At this time, the ventilation duct is attached to the module case 9*a*. The battery modules 9 may be inserted by hanging them with a rope or the like, but the most efficient manner is to use a suction pad, which allows lifting with a suction cup. The first-level battery module 9 is fastened by screws and the second-level battery module 9 is fixed using the collars 91, the long bolts 92 (refer to FIG. 16). Next, as shown in FIG. 17, a blower duct case in which the blower fan 17 and the relay 94 are integrated, a relay case 18 including the relays, the converter box 21 including the DC/DC converter and the battery controller 20 are arranged above the battery modules 9 and fixed thereto, and the blower fan 17 and the battery modules 9 are connected by ducts which are prepared in advance so as to secure distribution paths of cooling air. Next, the high voltage cables are connected to the battery modules 9 and the output terminals of the battery modules 9 and the SD switch 6 are connected so as to make electrical connections inside the power supply system 1. Then, the flanges of the upper cover and the lower container are stacked via a gasket and fixed with each other by fastening with screws, thereby completing assembly of the power supply system 1.

(Operation)

Next, with reference to FIG. 10, FIG. 11 and FIG. 17, the operation of the power supply system 1 of this embodiment will be explained with the ICs of the C/C 80, the MPU of the battery controller 20 and the higher controller 110 being main objects.

<Startup and the Like>

When the ignition switch IGN is positioned at an on position, the DC/DC converter in the converter box 21 receives power from the 24 V lead battery, converts the 24 V voltage into a 12 V voltage, and supplies 12 V power to the battery controller 20. Accordingly, the MPU of the battery controller 20 executes initial setting processing according to a program and program data which are expanded in a RAM, and when the MPU recognizes that the ignition switch IGN is positioned at the on position, the MPU starts the respective ICs IC-1A to IC-12B of the C/C 80 which are in a sleep state. Specifically, the MPU outputs a startup signal (wakeup signal) to the LIN reception line (Rx) and the FF reception line (FFON) and transmits a startup signal to the A-group IC IC-1A and the B-group IC IC-1B via the photo couplers PH1, PH2 of the higher-order side interface H-INT.

As such a signal, for example, a five-byte signal can be used, in which 8 bits are one unit. In this example, the signal is constituted of a break field (first 8 bits) indicating an arrival of a signal, a synchronized field (second 8 bits) for synchronization, an identifier field (third 8 bits) for identifying that it is a command (control instruction) to a particular IC, a data field (fourth 8 bits) expressing command contents, and a check digit (fifth 8 bits). With such a startup method, it is possible to suppress power consumption when an operation is stopped, and also there is an effect that a start operation of each IC can be performed via the loop signal transmission path. Also, reliability of the operation is high.

The LIN reception circuit 106 of the IC-1A converts a potential of a signal transmitted to the LIN1 terminal and transmits this signal to the reference power supply circuit 104. Accordingly, the reference power supply circuit 104 starts up, and the reference power supply circuit 104 charges the capacitor C6 which is externally attached to the IC-1A via a transistor which is omitted in the drawings. When the voltage of the capacitor C6 becomes a specified value or larger that is slightly smaller than a voltage (5 V) added to the VDD terminal, the logic circuit 103 starts up. Thereafter, the voltage of the capacitor C6 is controlled to be a constant value (5 V or 3.3 V or the like). The logic circuit 103 recognizes the startup signal transmitted from the MPU and transmits this by the LIN transmission circuit 107 via the LIN2 terminal to (the LIN1 terminal of) the following IC-2A on the lower potential side. Similarly, thereafter the IC-2A to IC-12A start up. The IC-12A returns the startup signal to the MPU via the photo coupler PH4 of the lower-order side interface L-INT. Such a startup operation is the same for the B-group ICs, but the IC-12B returns the startup signal to the MPU via the photo coupler PH5 of the lower-order side interface L-INT. The capacitor C6 is provided for stabilizing the reference power supply circuit 104, but also performs the operation as described above.

The MPU recognizes that all the ICs start up from the sleep state by the returned signal. Next, the MPU outputs a test signal to the FF input line (FFIN) and confirms whether it can be transmitted normally between the groups when all the B-groups detect overcharging (FF). When the test signal is inputted to the FFI terminal, the IC-1B in which the logic circuit 103 is started up outputs the test signal as it is (the test signal stored once in the register) via the FFO terminal from the FF output circuit 109 to (the FFI terminal of) the lower-order IC-2B. Thereafter, similarly, the test signal is transmitted to the IC-3B to IC-12B, and the IC-12B returns the test signal to the MPU via the photo coupler PH5 of the lower-order side interface L-INT. Thus, the MPU can recognize that there is no functional disorder in the B-group ICs or there is no breaking or the like in the transmission system (network) connected in a daisy chain.

After started up, the B-group ICs operate independently from the A-group ICs, and when any IC belonging to the B-group ICs detects overcharging (FF) of a cell, the FFI terminal and the FFO terminal up to the IC-12B use the transmission system to notify the overcharging of a particular cell to the MPU via the photo coupler PH5 from the FFO terminal of the IC-12B. By the above-described test during startup and the independent operation of the B-group ICs, high safety and reliability can be ensured even when lithium secondary cells are used for the cells 10. Note that the B-group ICs determine in the logic circuit whether the voltage of each cell measured by the voltage detecting circuit surpasses a predetermined overcharge voltage (for example, 4.35 V), and determine as overcharging when it surpasses and as normal when it does not surpasses. In this case, in the signal transmitted between the B-group ICs and to the MPU, the identifier field has information for identifying the IC which detected the overcharging, and the data field has information for identifying the cell which is overcharged. With such a structure and a detecting method, reliability of the detection improves, and moreover safety of the system improves.

When the MPU is notified of overcharging, it notifies this to the higher controller 110. The higher controller 110 immediately stops charging of the high voltage battery by regenerative braking of the inverter device 120 or charging of the battery by operation as a generator, and for eliminating the overcharging state of the particular cell, the higher controller 110 allows the vehicle to run with the motor 130 in a powering operation mode, namely, an operation mode in which the driving torque of the vehicle is generated by the motor 130. This operation mode is achieved by that the position of a revolving magnetic field generated at the rotor of the motor 130 by the operation of the inverter device is on an advancing side than the magnetic pole position of the rotor of the motor 130. In other words, when the revolving magnetic field generated by the rotor is allowed to revolve at the same speed as the rotation speed of the rotor of the motor 130, the motor 130 turns to a state of generating neither voltage nor torque. In this state, charging of the battery stops. Further, when the revolving magnetic field generated by the rotor is made faster than the rotation speed of the rotor of the motor 130, the motor 130 generates torque and consumes the power of the battery. With such a method and a system structure, there is an effect that high safety can be maintained.

When recognizing there is no problem in the B-group ICs, the MPU reports completion of starting up to the higher controller 110 via the communication line 96, and thereafter proceeds to the next instruction. Specifically, the MPU transmits a command to the IC-1A to IC-12A using the photo coupler PH1 of the higher-order side interface H-INT. Such a command includes, as will be described later, a voltage detection instruction of each cell and/or a capacity adjustment instruction.

The IC-1A converts the potential of a command signal obtained at the LIN1 terminal in the LIN reception circuit 106, and decrypts the signal in the logic circuit 103. Then, the signal is stored once in a register and the same signal is sent to the IC-2A via the LIN transmission circuit 107. The lower-order IC-2A to IC-12A executes similar operations. Then, the lowest-order IC-12A returns the command signal to the MPU via the photo coupler PH4.

The MPU confirms the returned command signal, and if it is normal, the MPU sends a next control instruction. The MPU integrates the number of errors related to a signal voltage, and when the number is equal to or lower than a tolerable number, sends the same command signal to the IC-1A for doing the process over. On the other hand, when a ratio of the number of errors reaches a tolerable value or above, the MPU judges this as abnormality and outputs an abnormality signal to the higher controller 110.

The IC-1A to IC-12A of the C/C 80 are connected in a daisy chain by the LIN1 terminals and the LIN2 terminals, and since control information is transmitted via a command signal, there is a time delay until control information reaches the IC-1A to the IC-12A. However, a voltage variation in the cells 10 during this period is quite small, and hence no problem occurs in practice. On the other hand, even when an error occurs in any one of the ICs, the MPU can detect this by comparing the command signal transmitted to the IC-1A with the command signal returned from the IC-12A. Particularly, in the power supply system 1 of this embodiment sending a command signal via the interfaces H-INT, L-INT, including the DC/DC converter and being connected to the inverter device 120, it is necessary to consider the influence of noise generated by them. The MPU can confirm that every command is recognized precisely in all the IC-1A to IC-12B, and thus the reliability of the system can be improved. Specifically, with the above-described starting method, control with high reliability becomes possible. Also, an abnormal state can be confirmed, and hence control with high safety can be realized.

<Voltage Detection>

When the power supply system 1 is in a charge/discharge stop state, the MPU transmits a voltage detecting command to the IC-1A to IC-12A via the photo coupler PH1. The MPU can determine whether the power supply system 1 is in any one of a charged state, discharged state, and a halt state by monitoring the output from the current sensor $S_r$. When the vehicle is running, charging/discharging are performed between the high voltage battery and the inverter device 120, and hence the voltage detecting command is executed when it is in the charge/discharge stop state of the battery. Also, in the case of a lithium secondary cell in which amorphous carbon is used as a negative electrode active material in cells, correlation between an open circuit voltage of a cell and a state of charge (SOC) or capacity thereof is quite high. By sending the voltage detecting command while in the charge/discharge stop state, a cell state such as SOC of each cell can be grasped accurately.

The MPU and the IC-1A to IC-12A execute the above-described operation at the startup time, and the MPU reports that the startup is completed to the higher controller 110 via the communication line 96. Upon reception of this report, the higher controller 110 issues the voltage detecting instruction to the MPU.

The MPU issues the voltage detecting command for a cell B1 to the IC-1A. The IC-1A stores command data in a register, and by sending the same command to the lower-order IC, the command is returned to the MPU. This method is similar to the above-described method. The logic circuit 103 of the IC-1A decrypts this voltage detecting command, and specifies the cell B1 as the voltage detecting target to the multiplexer MUX of the voltage detecting circuit 101 and obtains a digital voltage value of the cell as the voltage detecting target via the analog-digital converting circuit ADC. Next, by transmitting the obtained digital voltage value of the cell B1 as the voltage detecting target to the lower order IC, the MPU obtains a digital voltage value of the cell B1. Thereafter, the MPU sequentially repeats the voltage detecting command for the cell similarly to obtain digital voltage values of the cells B1 to B48. Thus, detection of a voltage with high reliability can be performed, and the SOC of a cell can be grasped with high accuracy. Note that the A-group ICs may be configured to store a measured voltage of a cell in a register and output the stored voltage in the register when it receives a voltage output command, which is different from the voltage detecting command.

The MPU confirms whether the command returned from the IC-12A has an error or not (if so, sends the same command again). Thereafter, the MPU takes in temperature values of cells B1, B5, B41, B45 detected by the temperature sensors TH1 to TH4 via the AD converter, and calculates an arithmetic mean value of the taken temperature values. Next, the MPU calculates SOCs of the obtained respective cells B1 to B48.

<Normal Operation>

At every predetermined time, the MPU reports to the higher controller 110 via the communication line 96 the SOC (state of charge) of all the cells B1 to B48 constituting the power supply system 1, a dischargeable output capacity, a chargeable output capacity, a mean temperature of the cells, the total voltage of the high voltage battery, a charge current, a discharge current, and so on.

Specifically, the MPU calculates the SOC of the cells B1 to B48 after startup, and begins integration of charge currents and discharge currents respectively, which are detected by the current sensor $S_I$. Also, the MPU takes in the voltage of the high voltage battery from the above-described total voltage circuit. Further, the MPU calculates the arithmetic mean value of the cell temperatures detected by the temperature sensors TH1 to TH4. Then, using the taken voltage of the high voltage battery, the integrated value of charge currents, the integrated value of discharge currents and the mean temperature of the cells, the MPU calculates the SOC of the cells B1 to B48, and also calculates a current dischargeable output capacity and chargeable output capacity. Note that the MPU turns the relay 94 to an on state to make the blower fan 17 operate for cooling all the cells constituting the high voltage battery at the time of startup. Accordingly, the reliability of control improves, and also cooling with higher reliability becomes possible.

<Capacity Adjustment>

As described above, the MPU grasps the SOC of all the cells B1 to B48 constituting the power supply system 1 at the time of startup. When there is dispersion of a specified value or larger in SOC of all the cells B1 to B48, an adjusted capacity for a cell (the cell as a capacity adjustment target) that exceeds a specified value is calculated so that the range of dispersion is in the range of the specified value, and a capacity adjustment time corresponding to the calculated adjustment capacity is calculated. Since resistance values of the capacity adjusting resistors R1 are known, the capacity adjustment time can be easily calculated with reference to a table for example. When the power supply system 1 is in a charge/discharge state, the MPU sends a capacity adjustment command for the cell as a capacity adjustment target to the IC-1A to IC-12A via the photo coupler PH1. The data field of this command includes information regarding the capacity adjustment time.

Such capacity adjustment is for preventing that a desired function as the battery module or the entire high voltage battery is not exhibited when there occurs dispersion in SOC of cells because a cell in which dispersion occurred becomes a load on other cells, and also for that it is necessary to assure a desired lifetime as the battery module or the entire high voltage battery, as a cell in which dispersion occurred tends to have a lifetime shorter than a designed lifetime. Therefore, it is preferable to perform control on the battery controller 20 side so that the dispersion in SOC of all the cells is in the range of the specified value.

In the charge/discharge state, a vehicle is in motion and thus the high voltage battery is charged/discharged. In a charged state, a part of the charge current is heat-consumed in the capacity adjusting resistors R1 and the charge current value of a cell having a high voltage (in which dispersion occurred) becomes small. In a discharged state, similarly, the discharge current is heat-consumed in the capacity adjusting resistors R1 and the discharge current value of a cell having a high voltage becomes large. As a result, the voltage of a cell having a high voltage gets close to the voltages of other cells.

Upon reception of the capacity adjusting command from the MPU, each IC stores command data in a register, and by sending the same command to a lower order IC, the instruction is returned to the MPU. This method is the same as the above-described one. The logic circuit 103 of each IC decrypts this capacity adjusting command, and judges whether a cell under the control of the logic circuit is a capacity adjustment target cell or not from the identifier field. When negation is judged, the logic circuit takes it as an instruction issued for another IC and does not respond, but when affirmation is judged, the logic circuit executes capacity adjustment of the capacity adjustment target cell during a capacity adjustment time instructed in the data field. Specifically, for example when the cell B2 is the capacity adjustment target cell, the switch control circuit 102 of the IC-1A outputs a high-level signal to the switch element SW2 arranged between the BR2 terminal and the CV3 terminal (refer to FIG. 11) during the instructed capacity adjustment time. The MPU similarly instructs the IC-1A to IC-12A regarding other cells which need capacity adjustment to allow the IC-1A to IC-12A to eliminate dispersion in SOC between the cells B1 to B48. After completing capacity adjustment of cells under their own control, the IC-1A to IC-12A transmits the completion to (the LIN1 terminal of) the lower-order IC via the LIN2 terminal, and thereby the MPU can recognize that the capacity adjustment of all the capacity adjustment target cells is completed.

(Effects and so on)

Although there are parts overlapping with the above explanation since the characteristics and effects which the power supply system 1 of this embodiment has are described in the above explanation, effects and so on of the power supply system 1 will be explained again in an organized manner.

Since the power supply system 1 of this embodiment includes the DC/DC converter in the converter box 21 to supply power to (or receive power from) the inverter device 120 (refer to FIG. 17), essentially it can be affected easily by noise from the chopper circuit of the DC/DC converter and the inverter of the inverter device 120. Specifically, the DC/DC converter affects the ICs of the C/C 80 via a constant voltage power generating circuit of 5 V or the like of the battery controller, and the inverter device 120 superposes noise on the high voltage battery via the high voltage cables 81, 82. Also, since the 48 cells are connected in series (refer to FIG. 10), the C/C 80 can be affected easily by noise due to a voltage variation. Even in such a harsh environment, the power supply system 1 (battery controller 20, C/C 80) is required to operate stable and precisely.

On the battery controller 20 side, as measures for this, the capacitors $C_N$, $C_P$ are interposed between the positive and the negative electrode of the high voltage battery and the case ground, respectively. This ground is the same potential as the minus side of the 12 V power converted by the DC/DC converter (also the same potential as the chassis of the hybrid vehicle). Noise is attenuated by the capacitors $C_N$, $C_P$, and the battery controller 20 operates stably.

On the other hand, in the C/C 80, only with interposition of the capacitors $C_N$, $C_P$, it is difficult to eliminate influence of noise of the above-described DC/DC converter and the inverter device 120 as well as influence of noise due to a voltage variation of the high voltage battery for ensuring a stable and precise operation. In this embodiment, as shown in the table 1, various noise and surge measures are implemented. Thus, even when noise due to a voltage variation and noise from the outside are superposed, it is possible to suppress noise and eliminate influence of surge voltage, and the C/C 80 can operate stably and precisely. Also, the ICs will not be destroyed in the manufacturing processes of the battery module 9 and the power supply system 1. Therefore, the power supply system of this embodiment can ensure reliability even in the above-described harsh environment.

Also, in the C/C 80, the 24 IC-1A to IC-12B of the same types are mounted on the substrate, and these ICs are aligned and arranged in a predetermined order. For example, they are mounted two by two on the rectangular longer sides of the rectangular continuous straight line 1-1' defined on the substrate from the IC-1A, IC-1B on the highest potential side to the IC-12A, IC-12B on the lowest potential side continuously in order of potential differences of the corresponding cell groups AB1 to AB12 (refer to FIG. 9). The distances between rectangular shorter sides of the rectangular continuous straight line 1-1' are the same in this embodiment. Accordingly, the ICs can be mounted compactly on the substrate while giving freedom in design of the C/C 80 according to the number of cells 10 constituting the battery modules 9, and the mounting area can be made small. Thus, the C/C 80 can be reduced in costs.

Further, in the C/C 80, the capacity adjusting resistors R1 constituting the capacity adjusting circuit are mounted in a divided manner at fixed regions of the IC, for example, two regions (dashed-line regions near the connecting connectors 48, 49 in FIG. 9) separated from the rectangular continuous straight line 1-1'. Accordingly, the influence to the IC-1A to IC-12B of heat generated by the resistors R1 during capacity adjustment can be minimized.

Also, in the C/C 80, the photo couplers PH1 to PH5 for performing communication in an insulated state with the MPU of the battery controller 20 are divided in two and mounted (the chain double-dashed line regions near the connecting connectors 48, 49 in FIG. 9). In conventional configurations, 6 photo couplers are needed in total. Since five photo couplers are sufficient in this embodiment, the substrate area of the C/C 80 is reduced and costs can be reduced.

Also, the C/C 80 relays the led-out lines from the temperature sensors TH1 to TH4 to the battery controller 20. These led-out lines are gathered integrally on the connector to which the voltage detecting lines 58 of the cell packs 19 are gathered. Therefore, at the time of assembly, connections are completed just by inserting the six connectors provided on the other side of the detection harness 52 in the connectors of the cell pack, connecting the harness connector on one side of the detection harness 52 to the connectors 48, 49 of the C/C 80, and connecting the connector on the tip of the communication harness 50 to the connector of the battery controller 20. Therefore, connection of these led-out lines can be performed integrally with connection of the voltage detecting lines, and thereby the labor of connection can be saved. Also, since these led-out lines are integrated with the detection harness 52 and the communication harness 50, there is no fear of disconnection or the like in a hybrid vehicle which generates vibration. Further, in this embodiment, since temperature detections are not performed on the C/C 80 side but performed on the battery controller 20 side, it is not needed to mount AD converters on the ICs. Accordingly, the ICs themselves can be suppressed to be small, and hence the substrate area of the C/C 80 can be made small.

Therefore, in the battery module 9, since the C/C 80 can be made small, the battery modules 9 can be reduced in size, and cooling spaces (passage for cooling air) for cooling the respective cells needed in the battery modules 9 can be assured sufficiently, thereby leading to reduction in size of the power supply system 1. In other words, the original performance of the battery can be drawn out, and a volume capacity density thereof can be increased.

Also, in the battery modules 9 constituting the power supply system 1 of this embodiment, lithium secondary cells are used for the cells 10. Accordingly, a volume capacity density higher than that of the nickel hydride secondary cell can be assured for example. Further, since amorphous carbon is used as the negative electrode active material, the state of charge (SOC) of the cells 10 can be grasped with high accuracy by measuring the open circuit voltage (OCV) as described above. Moreover, since lithium manganese complex oxide is used as the positive electrode active material, a low-cost cell can be made as compared to the case that for example lithium cobalt complex oxide is used for the positive electrode active material because the material is abundant. Thus, costs for the battery module 9 as well as the power supply system 1 can be reduced.

Moreover, since the B-group ICs which detect overcharging of the respective cells constituting the high voltage system are made independent from the A-group ICs to monitor the cells, reliability can be placed in an aspect of safety.

Further, in the power supply system 1 of this embodiment, the MPU of the battery controller 20 performs communication in an electrically non-insulated state with the ICs of the C/C 80 via the photo couplers PH1 to PH5, and also the total voltage circuit of the battery controller 20 is insulated from the high voltage of the high voltage battery by a transformer. Accordingly, there is no fear of causing voltage destruction, and propagation to the higher controller 110 side by short-circuit or the like can be prevented.

Also, in the power supply system 1 of this embodiment, two battery modules 9 are connected in series via the SD switch 6 for maintenance/inspection. Therefore, during maintenance/inspection, safety for a worker can be assured by turning the SD switch 6 to an off state to work thereon. Also, since the SD switch 6 is exposed on the module case 9a, the switch can be turned to an off state in the initial stage of maintenance/inspection before separating the lower container and the upper cover.

Also, in the power supply system 1 of this embodiment, the battery controller 20 receives power via the DC/DC converter from the 24 V lead battery which is an external power supply. Therefore, as compared to the case of receiving power from a high voltage battery constituted of two battery modules 9, the self-maintaining ability of battery functions can be increased. Although the power supply system 1 of this embodiment exhibits a large effect when used as a power supply device mounted in a vehicle, the power supply system 1 can be mounted in various types of mobile bodies since it includes the DC/DC converter and has certain effects. Note that in our country, 24 V lead batteries are adopted as power supply in many trucks.

Also, the power supply system 1 of this embodiment has the positive electrode side main relay $RL_P$ and the negative electrode side main relay $RL_N$ inside the relay case 18. Therefore, safety for the entire external apparatus can be increased in case that some external forces act on the power supply system 1 to break part of the power supply system 1. Further, since these high voltage relays control relays by a control signal from the inverter device 120 which receives power from the power supply system 1, safety thereof improves.

For example, in FIG. 17, before the inverter device 120 starts operation, for example when the vehicle is parked in a parking area or the like, the charge of the capacitor 128 is kept in a discharged state for safety. In conjunction with manipulation of the key of the vehicle, it is conceivable to improve safety by discharging the charge of the capacitor 128 when the key is removed. Next, when the manipulation of the key of the vehicle is performed again, the power supply system 1 starts supplying direct current power to the inverter device 120. Since large current flows in the input part of the inverter device 120 and the power supply system 1, electrical resistance in a power supply path is suppressed to be small. Accordingly, it is possible that a large current temporarily flows through the capacitor 128 when the power supply system 1 and the inverter device 120 are connected. There is a fear that the relays are damaged by this large current, and also there is a fear that the direct current terminals of the inverter device or the terminals of the capacitor 128 are damaged. In the above-described embodiment, by an instruction from the MCU 122 that is a control device of the inverter device 120, the relay $RL_{PRE}$ is made to conduct prior to the relay $RL_P$ so as to supply a current for charging the capacitor 128 via the resistor $R_{PRE}$ for limiting a current. When charging of the capacitor 128 proceeds and in a state that the terminal voltage is higher than a predetermined value, the relay $PL_P$ is made to conduct and a state that a direct current can be supplied to the inverter device 120 is created. With such a structure and control, the relay $RL_P$ of the power supply system 1 can be protected against adverse effects of a large current. Also, the direct current terminals of the inverter device 120 and the terminals of the capacitor 128 can be protected against adverse effects of a large current.

A sequence of the prior charging operations of the capacitor 128 may be performed by the higher controller 110, but when it is performed by an instruction not from the higher controller 110 but from the MCU 122, a control load on the higher controller 110 which is busy in controlling a start up of the vehicle can be reduced. Also, since the MCU 122 is provided in the same device as the capacitor 128, and is retained in a position where it is easy to detect the state of charge of the capacitor 128, it is possible to avoid complication of the entire system by adding the above function. For example, by allowing the MCU 122 to control both the discharging operation of the capacitor 128 and the above-described prior charging operation, charging and discharging of the capacitor 128 can be controlled without complicating the entire driving system of FIG. 17, thereby improving safety and reliability.

As described above, in the relay case 18, the precharge relay $RL_{PRE}$ having a small current resistance value than the positive electrode side main relay $RL_P$ is connected to the positive electrode side main relay $RL_P$ in parallel via the resistor $R_{PR}$, and at an initial time when the battery module 9 supplies power to the inverter device 120, the precharge relay $RL_{PRE}$ is controlled by the inverter device 120 to an on state to thereby charge the smoothing capacitor in the inverter device 120. Thus, it is possible to prevent an accident of fusing the positive electrode side main relay $RL_P$ and the negative electrode side main relay $RL_N$ even when the resistance on the input side of the inverter device 120 is small.

Moreover, in the power supply system 1 in this embodiment, the external case of the battery module 9 is made in a substantially hexahedron with the lower cover 45 having three faces of a front face, a bottom face, and a back face, the upper cover 46 having three faces of a left side face, a top face, and a right side face, and the lower cover 45 and the upper cover 46 being coupled. Accordingly, since spaces of the left side face and the right side face are open, workability (assembly performance) can be improved when two cell pack blocks 40 each constituted of six cell packs 19 are arranged on and fixed to the lower cover 45. Safety can be improved also when the lower cover 45 and the upper cover 46 are coupled since visual confirmation from the front face and the back face direction can be done. Also, since both the upper cover 46 and the lower cover 45 have three faces, costs can be reduced more than by the external case of a box structure having five faces.

Also, the power supply system 1 of this embodiment can be assembled step by step: the cells 10→the cell packs 19→(cell pack blocks 40)→the battery modules 9→the power supply system 1. Therefore, management of assembly units is easy. Also, since most of connections of the low voltage circuit are done with connectors, the connections are easy and miss wiring can be prevented, and also disconnection due to vibration or the like can be prevented when being mounted in a hybrid vehicle.

Also, in the battery module 9, the lower cover 45 forms the ducts 75 for the respective arranged cell packs 19, and the ventilation holes 76 are formed in the ducts 75 at positions corresponding to the spaces between the cells 10 constituting the cell packs 19. Thus, a structure is made in which cooling air blow upward from the lower side between the respective cells 10, and since the cooling air flowing through the ducts 75 has a constant temperature, the air having the constant temperature is blown to the respective cells 10, resulting in an almost constant cooling condition. Also, it becomes a very efficient structure in which the cooling system is completed by just forming the cell pack blocks 40, in which the cell packs 19 having the same shapes and the louver functions (arch-shape louver 36, cross-shape louver 37) inside are fixed, on the lower cover 45 having the ducts 75 and the ventilation holes 76. The louver shape does not need to be changed for each of the cells 10, and thereby simple assembly becomes possible. Further, the opening areas of the ventilation holes 76 are large on the introducing side of the cooling air and become small with distance toward the discharging side. Substantially halves of the ventilation holes which are closest to the introducing side are covered by the blocking louvers 77, and the ventilation holes which are closest to the discharging side have substantially the same opening areas as the ventilation holes which are closest to the introducing side. Accordingly, temperatures of the cells 10 can be almost constant.

Then, in the battery modules 9, the lower cover 45 has the lower cover projections 73 on the bottom face (refer to FIG. 6), and the upper cover recesses 89 are formed in the upper cover 46. Thus, it becomes possible to arrange the battery modules 9 in a stacking manner by engaging the lower cover projections 73 with the upper cover recesses 89. Accordingly, the power supply system 1 of this embodiment allows three-dimensional arrangement as compared to a planar arrangement of the battery module 9, thereby improving the spatial use ratio. Here, due to the structure of fixing with the collars 91 and the long bolts 92, influences of vibration or the like can be eliminated even when being mounted in a mobile body such as a hybrid vehicle.

Note that in this embodiment, the largeness of the effects of the inductors L, L' is explained related to the noise measures of the C/C 80, but as explained in the item 4 of the table 1, it is also possible to improve noise resistance of the ICs regarding the resistors R3.

Therefore, "a cell controller in which, for detecting voltages of respective cells of a serially connected body of cells constituted by further connecting a plurality of groups of cells in series, each of the groups being constituted of a plurality of cells connected in series, a plurality of ICs each having a voltage detecting circuit are arranged corresponding to the groups of cells, each of the ICs is provided with a voltage input terminal for receiving terminal voltages of cells constituting a corresponding group, an information reception terminal for receiving information from an IC corresponding to an adjacent group of cells, and an information transmission terminal which outputs information to an IC corresponding to an adjacent group of cells, the respective ICs corresponding to the groups in an association in order of potentials of cells constituting the respective groups constitute a loop information transmission path, and the information transmission terminal of an IC corresponding to one of the adjacent groups and the information reception terminal of an IC corresponding to the other one of the adjacent groups are connected via a resistor for transmitting/receiving information via the information transmission path." can also be included in the claims. Note that in the above-described embodiment, information is transmitted toward an IC corresponding to a group with a lower voltage from an IC corresponding to a group with a higher voltage, but it may be the inverse thereof. Adjacent groups have a relatively small potential difference therebetween, and hence information can be transmitted. Although terminal voltages of lithium secondary cells change by charge/discharge states thereof, reference potentials of the ICs corresponding respectively thereto change relatively when transmission of information is performed between the adjacent groups of cells, and the potential difference remains in a predetermined range. Thus, the transmission of information is easy, and high reliability can be maintained.

Also, as explained in the items 5, 6 of the table 1, it is possible to improve surge resistance or the like of the ICs regarding the schottky diodes D3, D4.

Therefore, "a cell controller including a plurality of ICs corresponding to groups of cells and each having a voltage detecting unit which detects voltages of respective cells in groups of cells in which an even number of cells are connected in series, in which each of the ICs has a mid-point voltage detecting terminal for detecting a voltage of a mid-point of the groups of cells, and a first schottky diode is interposed between the mid-point voltage detecting terminal and the GND terminal of each of the ICs." and "a cell controller including a plurality of ICs corresponding to groups of cells and each having a voltage detecting unit which detects voltages of respective cells in groups of cells in which an even number of cells are connected in series, in which each of the ICs has a mid-point voltage detecting terminal for detecting a voltage of a mid-point of the groups of cells, and a first schottky diode is interposed between the mid-point voltage detecting terminal and the GND terminal of each of the ICs and a second schottky diode is interposed between a Vcc terminal and the mid-point voltage detecting terminal of each of the ICs." can also be included in the claims.

Further, in this embodiment, an example is shown in which the switch elements for connecting the capacity adjusting resistors R1 to the cells in parallel are provided in the ICs. Although this way is quite excellent, the present invention is not limited to this, and the switch elements may be provided outside the ICs.

Also, in this embodiment, an example is shown in which a function to detect overcharging is provided in the B-group ICs, but the present invention is not limited to this. For example, overcharging, state of charge (SOC), state of health (SOH), or the like may be monitored. Further, in this embodiment, an example is shown in which a voltage detecting function and a capacity adjusting function for the cells are provided in the A-group ICs and a overcharging detecting function for the cells are provided in the B-group ICs, but any two of these three functions may be provided in the A-group ICs or the B-group ICs and any one thereof may be provided in the B-group ICs or the A-group ICs. In this case, the A-group ICs and the B-group ICs may be different circuits according to purposes, or may be in a form such that they are the same circuits but a part of functions is used by a group and a part of functions is not used. In a case of ASIC, in view of tool costs and running costs, it may be at lower costs than a case of manufacturing several types of ICs. Also, as described above, the A-group ICs and the B-group ICs may be constituted of one IC chip.

Also, in this embodiment, an example is shown in which a five-byte command signal is inputted to the FF reception line (FFON), but the present invention is not limited to this. In this embodiment, since the B-group ICs have a single function of monitoring overcharging, they may be configured to start by a high-level signal. Also, the FF output line (FFOUT) may be arranged to notify overcharging of any one of the cells to the MPU by a high-level signal. In this manner, since the signal is a binary value (high level or low level), transmission in a daisy-chain network can be made faster, and the MPU can comprehend overcharging faster, so that measures against overcharging are made quicker and safety can be improved. In this case, the MPU may be configured to allow the A-group ICs having a voltage detecting function to measure voltages, and know which cell is overcharged from their results thereafter.

Further, in this embodiment, as shown in FIG. 9, an example is shown in which, on the substrate of the C/C 80, the ICs are mounted four by four on the rectangular longer sides of the rectangular continuous straight line 1-1' from the IC-1A, IC-1B on the highest potential side to the IC-12A, IC-12B on the lowest potential side continuously in order of potential differences of the corresponding groups of cells AB1 to AB12, but the present invention is not limited to this. For example, the number of ICs mounted on the rectangular longer sides of the rectangular continuous straight line 1-1' may be different. Such a case is effective when connectors, circular holes for fixing a substrate, and so on must be arranged, and also in such a case, the distances between the rectangular shorter sides of the rectangular continuous straight line 1-1' may be changed, which assures freedom in design.

Also, in this embodiment, since a hybrid vehicle in our country, a hybrid truck in particular, has the 24 V lead battery mounted therein, the power supply system 1 having the DC/DC converter converting 24 V to 12 V is presented an example, but trucks having a 12 V led battery mounted therein are also in widespread use in the United States for example. In such a case, the DC/DC converter is not necessary, and the power supply system 1 can be reduced in size.

Also, this embodiment is optimum for automobiles including trucks and passenger cars, and it is conceivable that an automobile has different systems of power supply systems. By having the function of the DC/DC converter, it becomes possible to have a power supply system of a different system. When the rotation speed of the motor 130 increases, an internal induced voltage increases, which makes it difficult to supply a necessary current. It is conceivable to raise a voltage by the DC/DC converter to supply power with the raised voltage from the inverter to the motor. The above-described DC/DC converter can be used for raising of the supply voltage to the inverter. In this case, terminal voltages of the high voltage battery is not supplied directly to the capacitor 128 but are raised in voltage by the DC/DC converter, and direct current power with the raised voltage is supplied to the capacitor 128 and the power module 126.

Also, in this embodiment, an example is shown in which the temperature sensors TH1 to TH4 are fixed to the cells on the highest potential side in the groups AB1, AB2, AB11, AB12 constituted of cells, but since it is sufficient if the mean temperature for all the cells constituting the high voltage battery can be grasped, the present invention is not limited to the exemplified form. For example, the temperature sensors may be fixed to any cells of any two of the cell packs.

Further, in this embodiment, the power supply system 1 for a hybrid vehicle is shown as an example, but the present invention has quite a large effect when applied to a vehicle. Further, other than a vehicle, the present invention can be applied widely to power supply systems requiring charging/discharging of a large current and has certain effects. Also, in this embodiment, an example of the battery module 9 is shown in which 12 cell packs 19 are arranged in parallel in each of which four cells 10 are connected in series, but the present invention is not limited to the structure and the connection (serial, parallel) of the battery module 9. For example, the number of cells 10 may be changed, and the number or the arrangement of cell packs 19 may be changed. Further, in this embodiment, an example is shown in which two battery modules 9 are stacked vertically and accommodated in the external box, but three or more battery modules may be accommodated, or also a power supply system using one battery module 9 is possible.

However, dividing of the cells B1 to B47 shown in FIG. 10 into battery modules 9 on the higher potential side and the lower potential side have large effects as described above. Further, although there are two groups in this embodiment, the cells connected in series can be divided in several groups to be handled according to potentials, and the connectors 48, 49 connected to the C/C 80 can be divided based on potentials as shown in FIG. 9. Voltage differences of cells handled by the respective connectors become small, and the number of connecting pins of the connectors decreases. An influence of a partial connection state at the time of connecting or releasing the connectors can be made small.

Also, in this embodiment, cylindrical lithium secondary cells are shown as the cells 10 for example, but the present invention is not limited to this. For example, the cells 10 may have a prismatic, polygonal shape, and a secondary cell covered by a laminate film may be used. Also, other than the lithium secondary cell, another secondary cell such as a nickel hydride secondary cell may be used.

Then, in this embodiment, an example is shown in which the intake 14 and the exhaust port 15 of a battery module 9 are formed in the lower parts of the end faces on the both sides in the longitudinal direction respectively, but the present invention is not limited to this. For example, when the intake 14 is formed in an upper part of an end face of the battery module 9, the flow of cooling air is in a diagonal direction when viewed from a side face along the longitudinal direction of the battery module 9, which can increase the cooling effect. Further, the intake 14 may be formed in a side face along the longitudinal direction.

INDUSTRIAL AVAILABILITY

The present invention provides a cell controller which has excellent productivity, a battery module having the cell controller, and a power supply system including the battery module, and hence contributes to the manufacturing and sales of the cell controller, the battery module, and the power supply system. Thus, the present invention has industrial availability.

What is claimed is:
1. A cell controller, comprising:
a plurality of ICs which are connected in series electrically and which are disposed to correspond respectively to a plurality of unit cell groups each having a plurality of unit cells connected in series electrically; and
a plurality of capacity adjusting resistors which are disposed to correspond respectively to the plurality of unit cells and which are connected to a corresponding unit cell when a state of charge of the corresponding unit cell is adjusted,
the plurality of ICs respectively having:
a plurality of voltage detecting terminals to which respective of positive terminals and negative terminals of a plurality of unit cells constituting a corresponding unit cell group are connected;
a plurality of capacity adjusting terminals which are disposed to control conduction and blocking between respective of a plurality of unit cells constituting a corresponding unit cell group and capacity adjusting resistors disposed to correspond to respective of the plurality of unit cells;
a signal input terminal for inputting signals; and
a signal output terminal for outputting signals,
wherein, between a signal output terminal of an IC corresponding to one of two potentially adjacent unit cell groups and a signal input terminal of an IC corresponding to another of the two potentially adjacent unit cell groups, the signal output terminal of an IC corresponding to one of two potentially adjacent unit cell groups and the signal input terminal of an IC corresponding to another of the two potentially adjacent unit cell groups are connected so as to transmit signals, further comprising:
a plurality of first capacitors which are connected electrically between respective of positive electrodes and negative electrodes of the plurality of unit cells; and
a plurality of second capacitors which are connected electrically between voltage detection terminals corresponding to a positive electrode and a negative electrode of respective of unit cells of the plurality of voltage detection terminals.

2. The cell controller according to claim 1, wherein the first capacitors are disposed to eliminate noise on a high frequency side and wherein the second capacitors are disposed to eliminate noise of a low frequency side relative to the first capacitors.

3. The cell controller according to claim 1, wherein a capacity of the second capacitors is larger than that of the first capacitors.

4. The cell controller according to claim 1, wherein the first capacitors are disposed to eliminate noise on a high frequency side and the second capacitors are disposed to eliminate noise of a low frequency side relative to the first capacitors and wherein a capacity of the second capacitors is larger than that of the first capacitors.

5. The cell controller according to claim 1, further comprising:
a control substrate; and
a connector,
wherein, at the control substrate, the plurality of ICs, the plurality of capacity adjusting resistors, the first and second capacitors and a wiring for connecting between the signal output terminal of an IC corresponding to one of two potentially adjacent unit cell groups and the signal input terminal of an IC corresponding to another of the two potentially adjacent unit cell groups are disposed,
wherein the connector is disposed to connect electrically a wiring connected electrically to respective of positive terminals and negative terminals of the plurality of unit cells and a wiring which is disposed at the control substrate and which is connected electrically to the plurality of voltage detecting terminals of the plurality of ICs,
and wherein the connector is disposed at the control substrate.

6. The cell controller according to claim 5, wherein the first capacitors are disposed to eliminate noise on a high frequency side and wherein the second capacitors are disposed to eliminate noise of a low frequency side relative to the first capacitors.

7. The cell controller according to claim 5, wherein a capacity of the second capacitors is larger than that of the first capacitors.

8. The cell controller according to claim 5, wherein the first capacitors are disposed to eliminate noise on a high frequency side and the second capacitors are disposed to eliminate noise of a low frequency side relative to the first capacitors and wherein a capacity of the second capacitors is larger than that of the first capacitors.

9. A battery module, comprising:
a plurality of unit cell groups which is connected in series electrically and each of which has a plurality of unit cells connected in series electrically; and
a cell controller according to claim 1.

10. A cell controller, comprising:
a plurality of ICs which are connected in series electrically and which are disposed to correspond respectively to a plurality of unit cell groups each having a plurality of unit cells connected in series electrically; and a plurality of capacity adjusting resistors which are disposed to correspond respectively to the plurality of unit cells and which are connected to a corresponding unit cell when a state of charge of the corresponding unit cell is adjusted,
the plurality of ICs respectively having:
a plurality of voltage detecting terminals to which respective of positive terminals and negative terminals of a plurality of unit cells constituting a corresponding unit cell group are connected;
a plurality of capacity adjusting terminals which is disposed to control conduction and blocking between respective of a plurality of unit cells constituting a corresponding unit cell group and capacity adjusting resistors disposed to correspond to respective of the plurality of unit cells;
a signal input terminal for inputting signals;
a signal output terminal for outputting signals;
a power supply terminal which is connected electrically to a positive electrode of a unit cell having a highest potential among a plurality of unit cells constituting a corresponding unit cell group; and
a ground terminal which is connected electrically to a negative electrode of a unit cell having a lowest potential among a plurality of unit cells constituting a corresponding unit cell group,
wherein, between a signal output terminal of an IC corresponding to one of two potentially adjacent unit cell groups and a signal input terminal of an IC corresponding to another of the two potentially adjacent unit cell groups, the signal output terminal of an IC corresponding to one of two potentially adjacent unit cell groups and the signal input terminal of an IC corresponding to another of the two potentially adjacent unit cell groups are connected so as to transmit signals,
and wherein a plurality of capacitors are connected between the power supply terminal and the ground terminal.

11. The cell controller according to claim 10, wherein the plurality of capacitors is different in a capacity respectively.

12. The cell controller according to claim 10, wherein the plurality of ICs respectively has a reference voltage terminal for using generation of a reference voltage and wherein a third capacitor is inserted between the reference voltage terminal and the ground terminal.

13. The cell controller according to claim 10, wherein a Zener diode is connected between the power supply terminal and the ground terminal.

14. The cell controller according to claim 10, further comprising:
a control substrate; and
a connector,
wherein, at the control substrate, the plurality of ICs, the plurality of capacity adjusting resistors, the plurality of capacitors and a wiring for connecting between the signal output terminal of an IC corresponding to one of two potentially adjacent unit cell groups and the signal input terminal of an IC corresponding to another of the two potentially adjacent unit cell groups are disposed,
wherein the connector is disposed to connect electrically a wiring connected electrically to respective of positive terminals and negative terminals of the plurality of unit cells and a wiring which is disposed at the control substrate and which is connected electrically to the plurality of voltage detecting terminals of the plurality of ICs,
and wherein the connector is disposed at the control substrate.

15. The cell controller according to claim 14, wherein the plurality of capacitors is different in a capacity respectively.

16. The cell controller according to claim 14, wherein the plurality of ICs respectively has a reference voltage terminal for using generation of a reference voltage and wherein a third capacitor is inserted between the reference voltage terminal and the ground terminal.

17. The cell controller according to claim 14, wherein a Zener diode is connected between the power supply terminal and the ground terminal.

18. A battery module, comprising:
a plurality of unit cell groups which is connected in series electrically and each of which has a plurality of unit cells connected in series electrically; and
a cell controller according to claim 10.

19. A cell controller, comprising:
a plurality of ICs which are connected in series electrically and which are disposed to correspond respectively to a plurality of unit cell groups each having a plurality of unit cells connected in series electrically; and
a plurality of capacity adjusting resistors which are disposed to correspond respectively to the plurality of unit cells and which are connected to a corresponding unit cell when a state of charge of the corresponding unit cell is adjusted,
the plurality of ICs respectively having:
a plurality of voltage detecting terminals to which respective of positive terminals and negative terminals of a plurality of unit cells constituting a corresponding unit cell group are connected;
a plurality of capacity adjusting terminals which are disposed to control conduction and blocking between respective of a plurality of unit cells constituting a corresponding unit cell group and capacity adjusting resistors disposed to correspond to respective of the plurality of unit cells;
a signal input terminal for inputting signals;
a signal output terminal for outputting signals;
a power supply terminal which is connected electrically to a positive electrode of a unit cell having a highest potential among a plurality of unit cells constituting a corresponding unit cell group; and
a ground terminal which is connected electrically to a negative electrode of a unit cell having a lowest potential among a plurality of unit cells constituting a corresponding unit cell group,
wherein, between a signal output terminal of an IC corresponding to one of two potentially adjacent unit cell groups and a signal input terminal of an IC corresponding to another of the two potentially adjacent unit cell groups, the signal output terminal of an IC corresponding to one of two potentially adjacent unit cell groups and the signal input terminal of an IC corresponding to another of the two potentially adjacent unit cell groups are connected via a resistor so as to transmit signals.

20. The cell controller according to claim 19, wherein a Zener diode is connected between the signal input terminal and the ground terminal.

21. The cell controller according to claim 19, further comprising:
a control substrate; and
a connector,
wherein, at the control substrate, the plurality of ICs, the plurality of capacity adjusting resistors, a wiring for connecting between the signal output terminal of an IC corresponding to one of two potentially adjacent unit cell groups and the signal input terminal of an IC corresponding to another of the two potentially adjacent unit cell groups and the resistor disposed between the signal output terminal of an IC corresponding to one of two potentially adjacent unit cell groups and the signal input terminal of an IC corresponding to another of the two potentially adjacent unit cell groups are disposed,
wherein the connector is disposed to connect electrically a wiring connected electrically to respective of positive terminals and negative terminals of the plurality of unit cells and a wiring which is disposed at the control substrate and which is connected electrically to the plurality of voltage detecting terminals of the plurality of ICs,
and wherein the connector is disposed at the control substrate.

22. The cell controller according to claim 21, wherein a Zener diode is connected between the signal input terminal and the ground terminal.

23. A battery module, comprising:
a plurality of unit cell groups which is connected in series electrically and each of which has a plurality of unit cells connected in series electrically; and
a cell controller according to claim 19.

* * * * *